United States Patent [19]
Kleimola

[11] 3,984,282
[45] Oct. 5, 1976

[54] PASSIVE CONTAINMENT SYSTEM FOR A NUCLEAR REACTOR

[75] Inventor: Frank W. Kleimola, Jackson, Mich.

[73] Assignee: Nucledyne Engineering Corporation, Reed City, Mich.

[22] Filed: July 30, 1973

[21] Appl. No.: 383,485

Related U.S. Application Data

[63] Continuation of Ser. No. 61,063, Aug. 5, 1970, abandoned.

[52] U.S. Cl. .................................. 176/38; 176/37; 176/87
[51] Int. Cl.² .......................................... G21C 9/00
[58] Field of Search .......................... 176/37, 38, 87

[56] References Cited
UNITED STATES PATENTS

| | | | |
|---|---|---|---|
| 3,115,450 | 12/1963 | Schanz | 176/37 |
| 3,375,162 | 3/1968 | Wilson | 176/37 |
| 3,423,286 | 1/1969 | Weems et al. | 176/37 |
| 3,438,857 | 4/1969 | Sulzer | 176/37 |
| 3,454,466 | 7/1969 | Pitt et al. | 176/38 |
| 3,488,254 | 1/1970 | Davey et al. | 176/37 |
| 3,494,828 | 2/1970 | Chave | 176/38 |
| 3,580,806 | 5/1971 | Weems et al. | 176/37 |

Primary Examiner—Stephen C. Bentley
Assistant Examiner—Peter A. Nelson
Attorney, Agent, or Firm—Lon H. Romanski

[57] ABSTRACT

A containment system that provides complete protection entirely by passive means for the loss of coolant accident in a nuclear power plant and wherein all stored energy released in the coolant blowdown is contained and absorbed while the nuclear fuel is continuously maintained submerged in liquid. The primary containment vessel is restored to a high subatmospheric pressure within a few minutes after accident initiation and the decay heat is safely transferred to the environment while radiolytic hydrogen is contained by passive means.

25 Claims, 12 Drawing Figures

INVENTOR
FRANK W. KLEIMOLA

INVENTOR
FRANK W. KLEMOLA
BY

PASSIVE CONTAINMENT SYSTEM FOR A NUCLEAR REACTOR

RELATED APPLICATION

This application is a continuation of my copending application Ser. No. 61,063 filed Aug. 5, 1970, for Passive Containment System now abandoned.

BACKGROUND OF THE INVENTION

1. Field of the Invention

Nuclear power plants are required by practice to be designed in such a manner that the health and safety of the public is assured even for the most adverse accident that can be postulated. For plants utilizing light water as a coolant the most adverse accident is considered to be a double-ended break of the largest pipe in the reactor coolant system and is termed the Loss of Coolant Accident (LOCA).

For accident protection, these plants utilize containment systems that are designed to physically contain water, steam, and any entrained fission products thay may escape from the reactor coolant system. The containment system is normally considered to encompass all structures, systems and devices that provide ultimate reliability in complete protection for any accident that may occur. Engineered safety systems are specifically designed to mitigate the consequences of an accident. Basically, the design goal of a containment system is that no radioactive material escapes from the nuclear power plant in the event of an accident so that the lives of the surrounding populace are not endangered.

The passive containment system herein disclosed provides this level of protection for a loss of coolant accident and for the other types of accidents that are considered as a basis of design, and is considered to be effective for nuclear power plants employing either Pressurized Water Reactors or Boiling Water Reactors.

2. The Prior Art

Prior art techniques have utilized either full-pressure "dry-type" containment or pressure suppression containment for light water cooled nuclear power plants.

In the full-pressure containment the reactor building, completely enclosing the reactor coolant system, is capable of withstanding the pressure and temperature rise expected from a LOCA. The building is typically constructed either of steel or steel-lined reinforced concrete or prestressed concrete.

Refinements of full-pressure containment include double leakage-control barriers and subatmospheric pressure operation. For the double leakage-control barrier any leakage into the control annulus is either pumped back into the primary containment, or the leakage is treated before being exhausted to the outside atmosphere. For subatmospheric operation the containment is normally maintained at partial vacuum, and following LOCA, the pressure is reduced back to less than the outside atmosphere utilizing active engineered safety systems to terminate any potential release of radioactivity to the environment.

The pressure-suppression containment consists of a drywell that houses the reactor coolant system, a pressure suppression chamber containing a pool of water, and a vent system connecting the drywell to the pool of water. The containment structure is constructed of steel enclosed by reinforced concrete, or is steel-lined with reinforced concrete. The pressure-suppression containment is housed within a reactor building.

In the event of a LOCA, the reactor coolant partially flashes to steam within the drywell, and the air, steam, and liquid coolant flows through the connecting vents into the pool of water in the suppression chamber. The steam is condensed by the water and decreases the potential pressure rise in the containment. The air rises into the free space above the pool of water in the suppression chamber.

Refinements in pressure-suppression containment utilizing water includes the inerting of the containment atmosphere. Inerting is aimed at preventing the burning of hydrogen evolved from metal-water reactions of overheated nuclear fuel.

A different type of pressure suppression containment utilizes an ice-condenser. The ice is maintained in a refrigerated compartment surrounding the reactor coolant system. The ice-condenser containment is divided into an upper chamber and a lower chamber with the reactor coolant system in the latter. In the event of a LOCA a pressure rise of the lower chamber causes access panels located at the bottom of the ice-storage compartment to open. This provides a flow path for air and steam through the ice bed. The steam is condensed by the ice and decreases the potential pressure rise in the containment. The air passes into the upper chamber through top access panels forced open by the flow of air.

Full-pressure containment and pressure-suppression containment are passive structures that require support systems for accident containment. Active systems such as residual heat removal systems and containment spray systems ae used to dissipate heat to the environs. This prevents the containment design pressure and temperature from being exceeded, and in the process, the containment pressure is reduced to limit the leakage of fission products. Active filtration systems are required in conjunction with the spray systems to reduce fission product concentration in the containment atmosphere. This also limits the amount of fission products that can leak out of the containment to the environs. Hydrogen recombiners are also being considered to protect the containment from developing explosive concentrations of hydrogen.

To be effective, both the full-pressure containment and the pressure-suppression containment require additional engineered safety systems that provide emergency cooling of the nuclear fuel. Some Pressurized water Reactors require passive accumulator systems in addition to active high and low pressure injection systems to maintain an adequate amount of liquid coolant at the nuclear fuel. The residual heat removal systems used for containment pressure reduction also rejects decay heat to the environs.

Pressure suppression with gravity flooding has also been proposed as an engineered safety system for the LOCA.

Active engineered safety systems are inherently required to function effectively in order to maintain the integrity of the containment system in the LOCA. Active systems require high integrity instrumentation and control equipment, rotating machinery, electric power sources and power distribution equipment. These systems need to function properly as part of a larger system under adverse containment environment conditions of high pressure, high temperature, high humidity, and high radioactivity.

Malfunctioning of any active engineered safety system imposes even more adverse conditions on the operable systems. For instance, an inadequate source of electric power may result in the malfunctioning of the emergency core cooling system for the nuclear fuel. Overheating of the fuel can result in melting of the fuel cladding with metal-water reactions occuring. The fuel core may slump and portions could collapse and overheat the bottom of the reactor vessel. Hydrogen is released from metalwater reactions and is subject to burning. The added energy from the metal-water reactions and from the burning of hydrogen imposes even more severe requirements on the containment structure. Overheating of the fuel and melting of the clad results in a gross release of fission products that are available for leakage out of the containment system. This example points to the critical nature of active engineered safety systems that are an essential part of the containment systems of the prior art.

SUMMARY OF THE INVENTION

This invention relates to a nuclear reactor containment arrangement and relates more particularly to an entirely passive containment system which encloses a reactor system and which uses a high pressure, high temperature coolant and/or moderator such as light or heavy water.

In the exemplary application of the invention, the passive containment system is used to safely contain even the most adverse reactor accident wherein a sudden rupture of the reactor piping results in the loss of coolant accident (LOCA). The passive containment system herein provides equal protection for nuclear reactor systems of the pressurized water or boiling water types.

The passive containment system for the pressurized water reactor consists of interconnected cells; each cell houses a major component of the nuclear reactor system; i.e. reactor vessel, steam generators, pumps, pressurizer, regenerative heat exchanger, and piping. Within the containment cells a primary container formed from interconnected steel shells enclose the entire reactor coolant system. A secondary steel container immediately surrounds the primary container. The secondary in turn is encased by reinforced or prestressed concrete. The annulus between the primary and secondary containers is water-filled. Deluge tanks located entirely within the containment cells at an elevation above the reactor coolant system piping are also water-filled. Rupture disks are located at the bottom end of each deluge tank. Safety relief devices at the primary container and also at the secondary container discharge into a deep well.

The deep well surrounds the reactor vessel containment cell and extends downward below the reactor vessel. The steel-lined deep well containing coupling fluid is encased by reinforced concrete and/or prestressed concrete. Two separate sets of heat exchange units are submerged in the deep well and are separated by a flow baffle that extends virtually the full height of the deep well. One heat exchange unit opens into the reactor vessel cavity with the second heat exchange unit opening into an outdoor body of water. Heat exchange units are also submerged in the coupling fluid which fills the annulus between the primary and secondary containers. These units also open into the outdoor body of water.

The water used within the deluge tanks and within the annulus between the primary and secondary containers is specially treated for accident containment purposes. The water is degassed and contains chemicals in solution that serve as a poison to neutrons, inhibitors of corrosion, oxygen "getters," and radionuclie "getters". The water is retained in a chilled condition by steam-jet refrigeration systems or by heat exchanger units.

The passive containment system is normally housed within a reactor building. The arrangement of the cell structures permits the location of spent fuel storage pools and a refueling cavity within the reactor building. Heat exchange units at the spent fuel storage pools open to the outdoor body of water.

In a typical response of the passive containment system hereof to a LOCA, decompression of the reactor coolant through the pipe break produces steam within the primary container that is normally maintained at a high-vacuum. The steam pressurizes the container and at a preset pressure, bursts the rupture disks at the deluge tanks. Steam carryover into the deluge tank ensues. The steam carryover and thermal expansion causes the deluge tanks to become "water-logged." With the tanks "water-logged" the confined volume of the primary container is increased in pressure until the coolant blowdown is arrested by the container back-pressure. The primary container is designed so that the coolant blowdown is arrested by the container back-pressure with a sufficient amount of fluid still retained in the reactor vessel to keep the nuclear fuel fully submerged in reactor coolant.

The chilled water in the elevated deluge tanks quenches the steam carryover during coolant blowdown as the container back-pressure increases to arrest the blowdown. With coolant blowdown arrested a gravity deluge of the chilled water with neutron poison is solution completely submerges the reactor piping and refills the reactor coolant system through the pipe break that resulted in loss of coolant. All stored energy within the reactor system is absorbed by the deluge water. Sufficient heat capacity is provided in the deluge water to reduce temperatures to low levels so that the primary container atmosphere is restored to the normal high-vacuum condition by the deluge. Any leakage from the primary container during the blowdown and deluge is absorbed by the water in the secondary container. Any overpressure of the primary container during the blowdown is relieved to the water in the deep well.

The continued energy release as decay heat from the nuclear fuel is passively transferred to the environs by thermal conduction and natural convection. This heat is first transferred by convection from the fuel to the reactor coolant and then by conduction through the uninsulated metal walls of the reactor system to the deluge water in the primary container. Cooling pipes that connect to the heat exchange unit in the deep well transfers the heat by conduction and convection from the reactor vessel cavity to the water in the well. Thermal convection circulates the water in the deep well around the flow baffle and past the second heat exchange unit in the well. At the second heat exchange units, exposed to an outdoor body of water by open pipe circuits, the heat is conducted to this water and transferred to the outdoors by thermal convection.

Energy is also transferred passively to the outdoors via the secondary container water. Heat is conducted through the steel shell from the deluge water in the primary container to the water in the secondary container. The heat then flows by convection and conduction into the heat exchange units within the secondary container. Cooling water from the outdoor body of water circulates by thermal convection through the heat exchange units to transfer the heat from the secondary container water to the outdoors.

The passive containment system arrangement permits the spent fuel storage pools and reactor auxiliary systems and components to be housed within the reactor building. This arrangement also lends itself to passive heat exchange circuits that are connected to heat exchange units located at the spent fuel storage pools and at the reactor auxiliary systems and components. These passive heat exchange units reject heat to the outdoor body of water.

OBJECTS OF THE INVENTION

It is therefore a general object of this invention to provide a new and improved containment method for any energy, toxic, or radioactive materials released from a process system accommodated therein.

It is a more particular object of this invention to provide a passive containment process and apparatus for a nuclear reactor assemblage.

Another object of this invention is to provide functional improvements in the complete containment of a nuclear reactor system through strictly passive means entirely actuated, controlled, powered and maintained by the forces in nature that are designed to be intrinsic to the containment system.

Still another object of this invention is to provide a reactor containment system that is less expensive to construct in that the primary containment free volume is effectively reduced, less expensive materials and active safety systems currently used in reactor containment systems are eliminated.

Still another object of this invention is to provide a containment system that permits an improvement in the structural and equipment arrangements to provide compactness in design.

Still another object of this invention is to provide an absolutely reliable containment system for the nuclear reactor assemblage accommodated therein to permit greater freedom in the siting of nuclear power plants in order to substantially reduce the costs of supplying electric power to a metropolitan community.

Still another object of the invention is to provide a passive containment system that is compatible with the accidents that are the basis of design including the loss of coolant accident with a double-ended rupture of the largest pipe in the reactor coolant system.

Still another object of this invention is to provide a passive containment system that permits a structural and equipment arrangement that is compatible to withstanding the additional forces imposed by natural phenomena including snow and ice loads, hurricanes, tornadoes, flooding conditions such as tsunami and seiches, and earthquakes; and provides protection in depth to external missiles including airplane collisions.

A further object of this invention is to provide a passive containment system that harnesses the forces of physics to provide the ultimate level of reliability in the containment of nuclear power plants.

BRIEF DESCRIPTION OF DRAWINGS

These objects and other benefits derived from the invention will be more fully presented in the detailed description of an embodiment for a pressurized water reactor with reference to the following drawings in which:

FIG. 9 compares the net free volume requirement to the peak accident pressure for a full pressure (dry-type) containment normally operated at (a) atmospheric pressure (14.7 psia), (b) high-vacuum (2.0 psia) and (c) full-vacuum (0 psia);

FIG. 10 compares the amount of reactor coolant retained in the liquid phase (total in reactor coolant system and primary containment) to the peak accident pressure (containment back-pressure) for a full-pressure (dry-type) containment; also the amount retained in the reactor vessel alone;

FIG. 11 compares the amount of reactor coolant retained in the liquid phase within the reactor vessel alone to the peak accident pressure (primary container back pressure) for a passive containment system with steam carryover into deluge tanks and the primary container net free volume in cubic feet set at (a) 100,000 (b) 75,000 (c) 50,000 and (d) 35,000;

FIG. 12 compares the primary container pressure after deluge to the mass of deluge fluid provided in the passive containment system stored at (a) 60°F, (b) 50°F and (c) 40°F; the primary container net free folume for this comparison is set at 35,000 cubic feet with the container pressure being maintained at 2.0 psia before the design basis accident.

DETAILED DESCRIPTION OF PREFERRED EMBODIMENT

Figure 1:
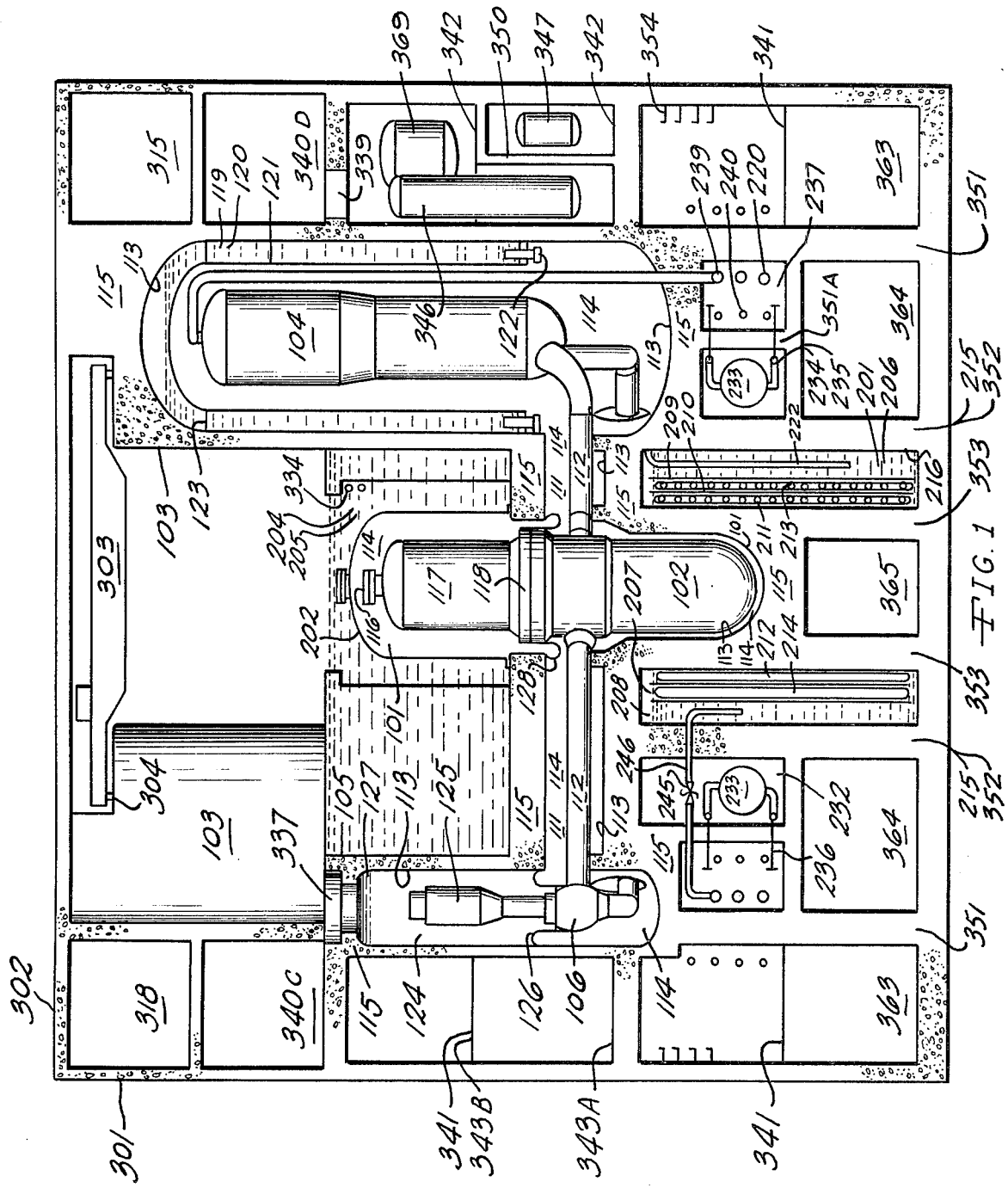
FIG. 1 is a vertical section of the reactor building arrangement for the passive containment system according to the invention and taken through a reactor coolant pump cell, the reactor vessel cell, a steam generator cell, and interconnecting reactor coolant system piping cells substantially along reference line I—I of FIG. 3.
Figure 2:
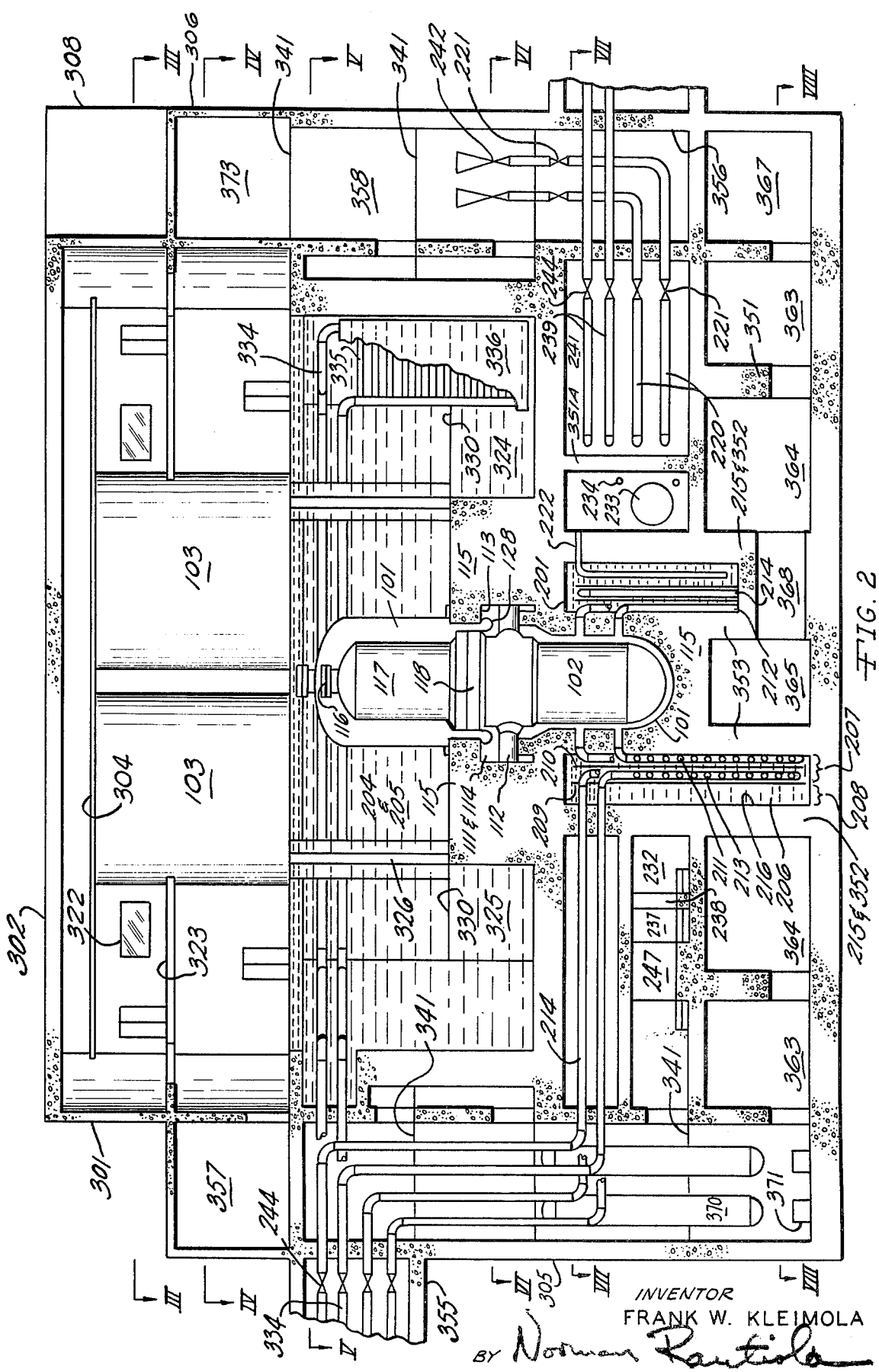
FIG. 2 is a vertical section of the reactor building arrangement and taken through the two spent fuel pools sandwiching the reactor refueling cavity substantially along reference line II—II of FIG. 3.
Figure 3:
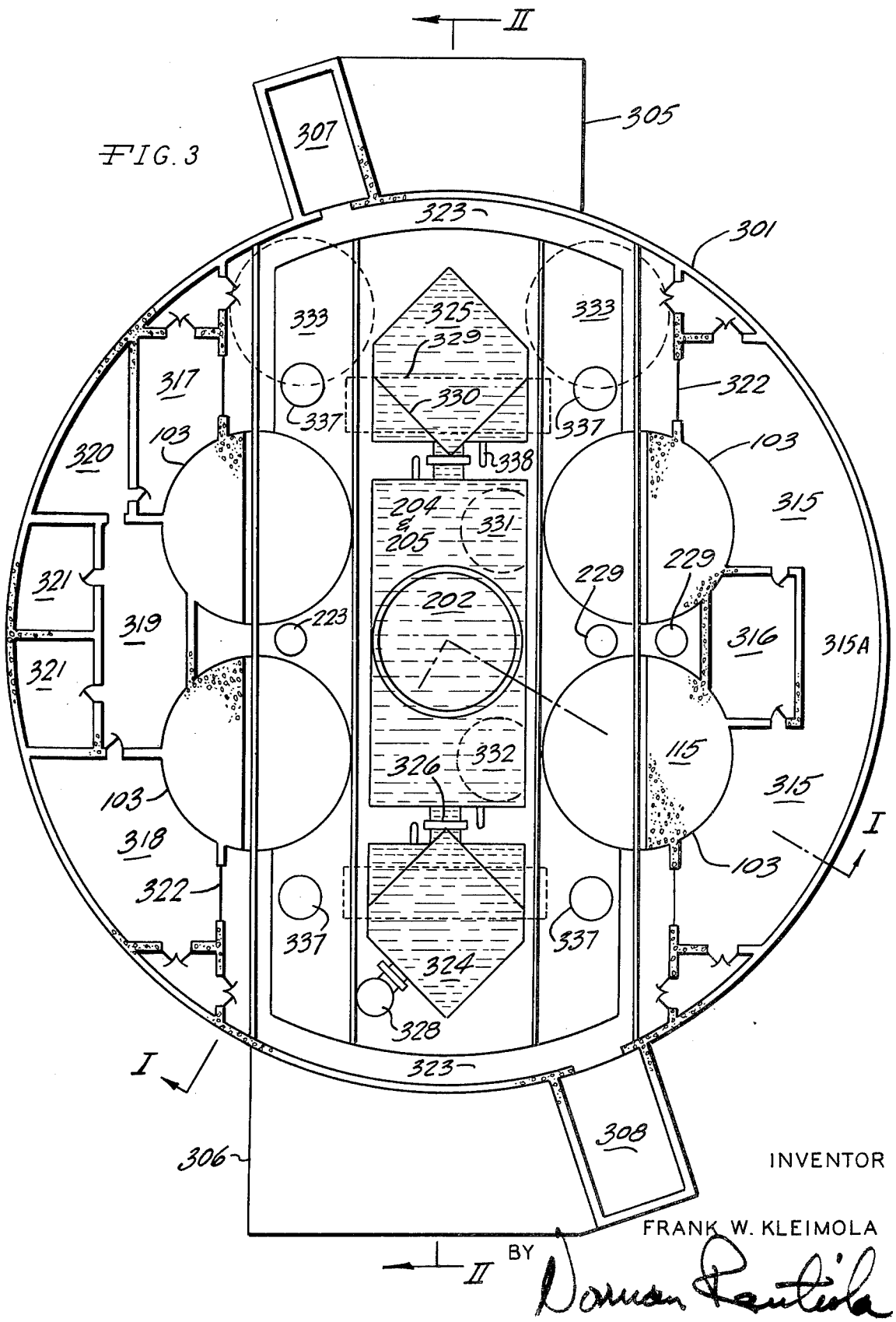
FIGS. 3, 4, 5, 6, 7 and 8 are cross-sectional views of the reactor building arrangement on the lines III—III, IV—IV, V—V, VI—UI, VII—VII and VIII—UIII respectively of FIG. 2.
Figure 4:
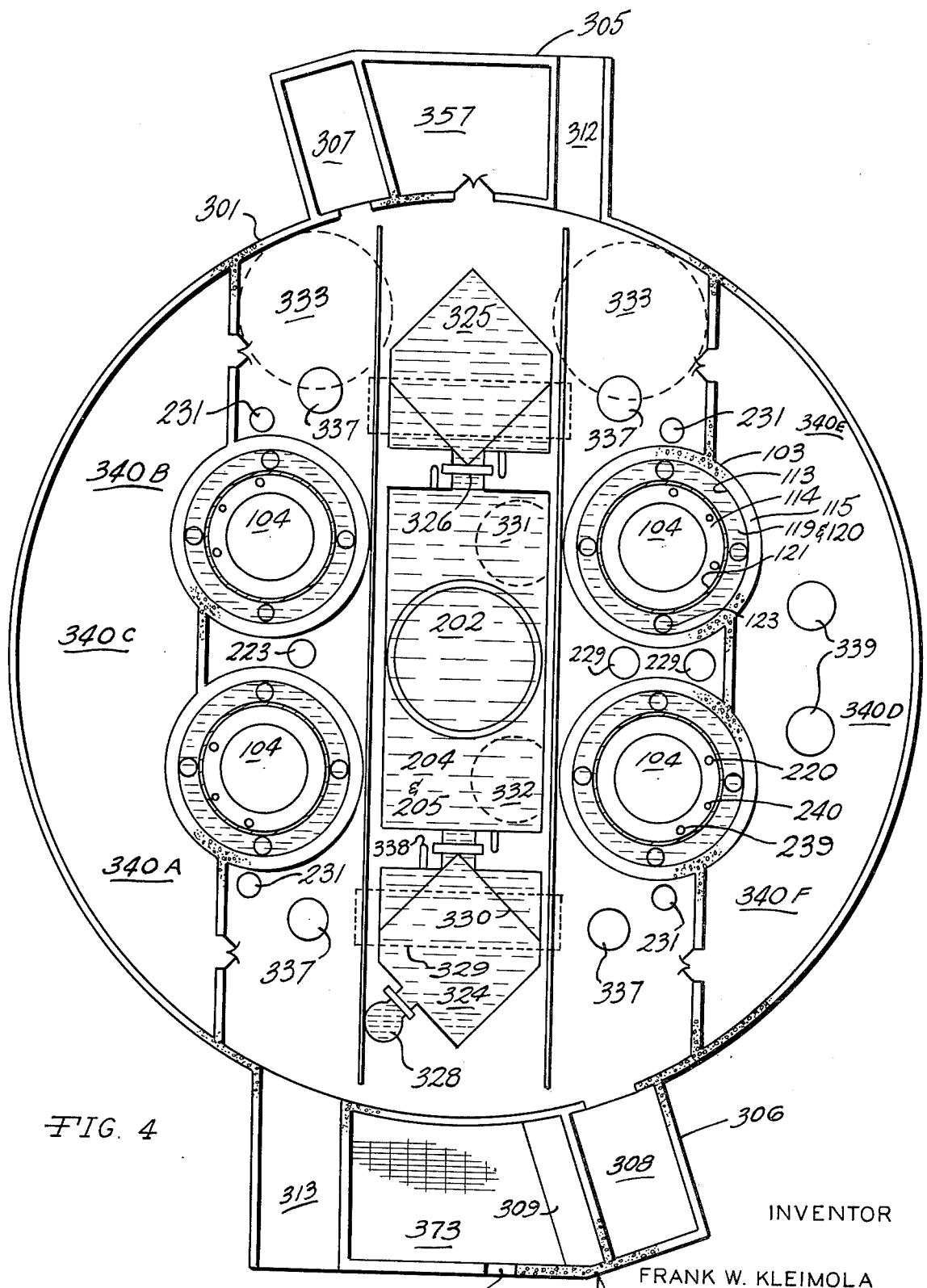
Figure 5:
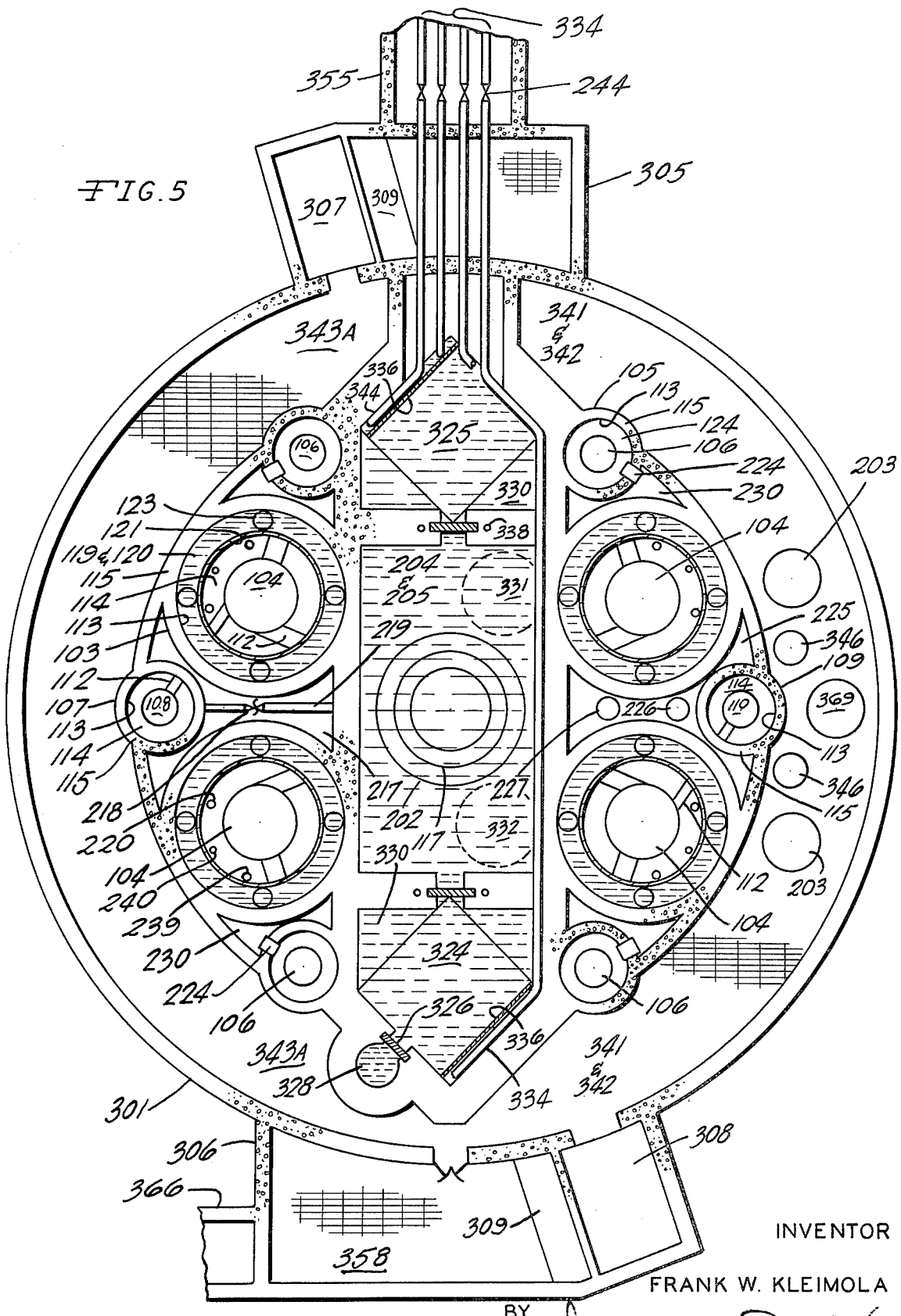
Figure 6:
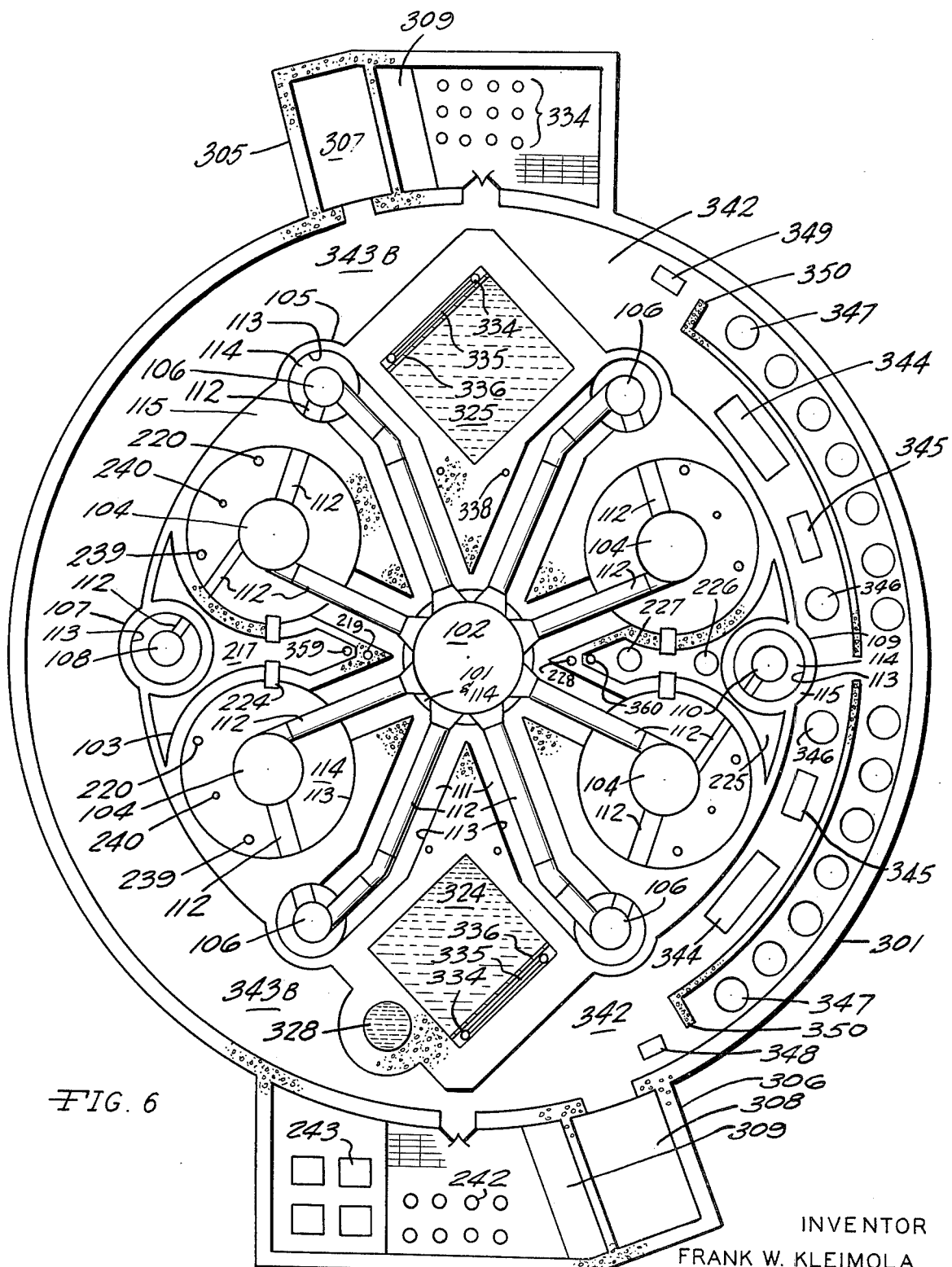
Figure 7:
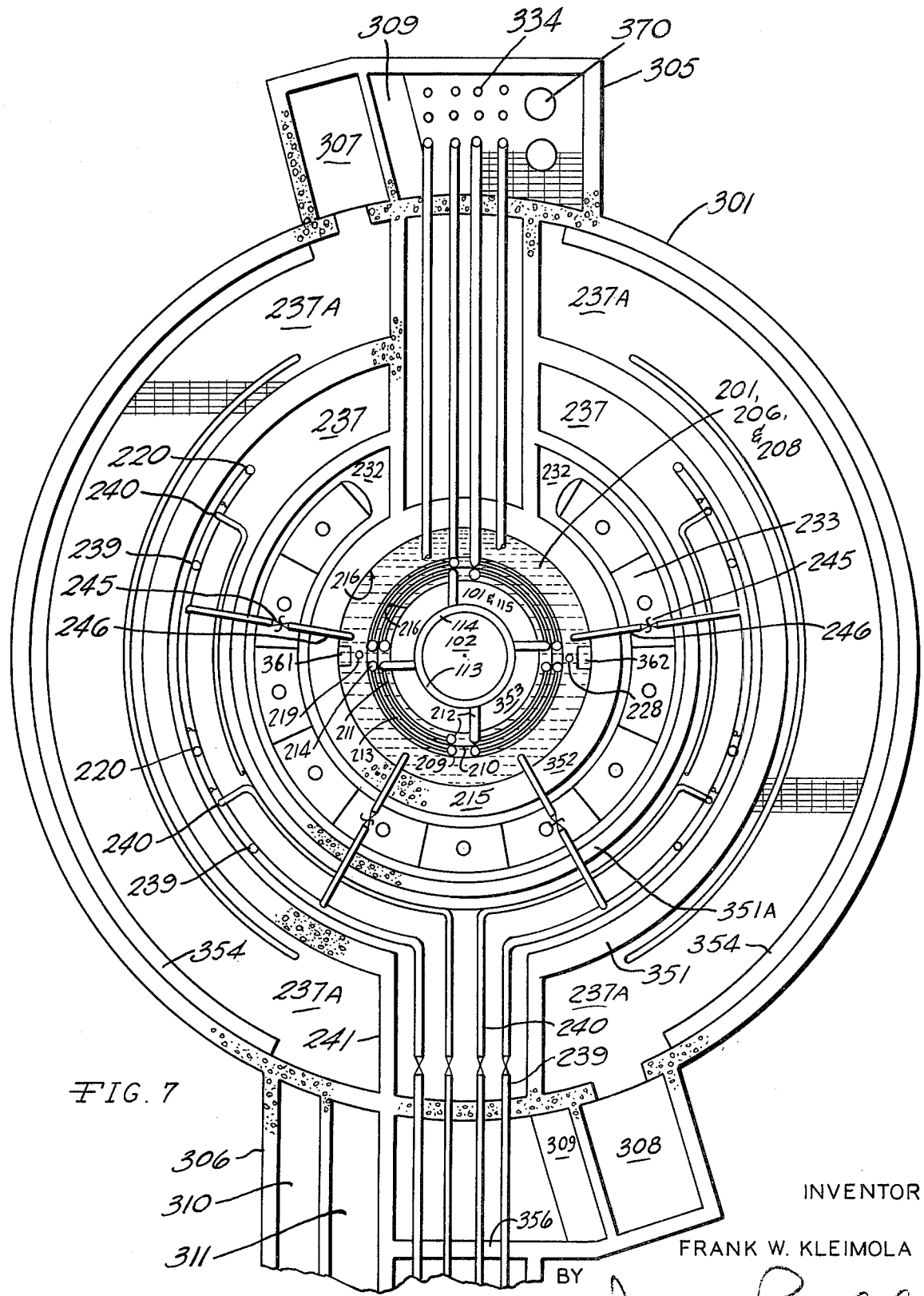
Figure 8:
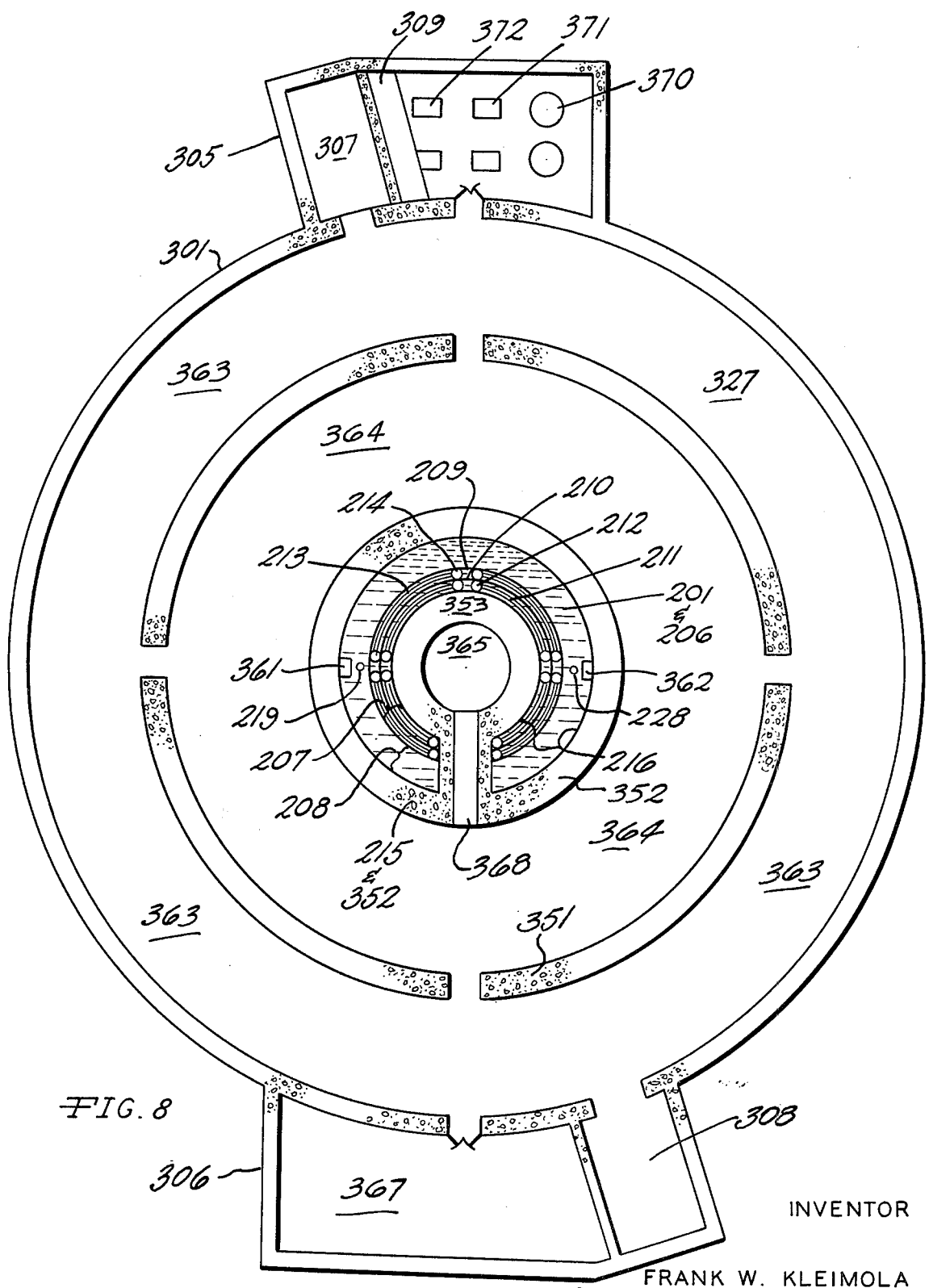

Referring now to the drawings a passive containment system for a four loop pressurized water reactor is revealed therein, FIGS. 1 through 8 inclusive. The primary containment consists of interconnected cells that enclose the reactor coolant system components. A reactor vessel cell 101 houses the reactor vessel 102. Each one of the four steam generator cells 103 encloses a steam generator 104. Four reactor coolant pump cells 105 each house a reactor coolant pump 106. A pressurizer cell 107 houses the pressurizer 108. A regenerative heat exchanger cell 109 encloses the high-pressure regenerative heat exchanger 110. Reactor coolant system piping cells 111 house the reactor coolant system piping 112.

The containment cells are constructed from steel and concrete. A continuous steel lining 113 provides form to the interconnected cells. Within the cells the free space 114 permits access for the maintenance of reactor system components. The containment cells in general are enclosed by concrete structure 115.

The steel lining 113 is of double-wall construction (not shown). The annular space between the steel plates is filled with water that has neutron poison in solution. The space enclosed by the inner plate forms the primary container for the reactor coolant system. During reactor operation at power this free space is maintained at a high-vacuum to thereby eliminate the need for thermal insulation at the exterior surfaces of the reactor coolant system. During reactor shutdown for maintenance operations, air at atmospheric pressure is circulated within the primary container utilizing the vacuum lines penetrating the primary container.

The water-filled annulus between the two steel plates provides a "water-jacket" that serves as a "cold-wall" for the primary container except at the containment penetrations. Leakage from the primary container is absorbed by the water within the secondary container. The spacing of plates at the "cold-wall" can vary from a few inches to a number of feet as required in the detail design of the passive containment system.

Most all primary containment cells are enclosed by a concrete structure 115, (either prestressed or reinforced as determined in the design) except the reactor vessel flanged head 118 has a steel pressure container 117 that houses the control rod drives. A flanged manhole 116 at the pressure container provides access to the control rod drives.

A number of the primary containment cells are compartmented. The reactor vessel has two compartments; an upper and a lower. The upper compartment is formed by the flanged steel dome 202; this dome is positioned over the reactor vessel flanged head 118. The lower compartment houses the reactor vessel 102. The two compartments are isolated from each other by a steel diaphragm 128. For reactor refueling with the reactor vessel flanged head 118 removed; a seal ring may be bolted into place to provide ea second water-tight seal between the upper and lower compartments. This second seal (not shown) bridges the annular space between the reactor vessel flange and the containment steel liner at the reactor vessel cell 101.

Each one of the four steam generator cells 103 has a deluge tank 119. The free space 114 immediately around the steam generator 104 provides space for piping. The deluge tanks 119 contain borated deluge water 120, this water is contained in the annulus formed by the cell liner 113 and the steel shell 121. Rupture disks 122 are positioned at the bottom end of the deluge tanks. These rupture disks are located underneath pipes 123 that provide circulation of the deluge water during quenching of steam from the reactor coolant blowdown in a loss-of-coolant accident. The number and size of the rupture disks are determined in the detailed design.

The deluge tanks contain enough highly borated water to flood the containment cells and also the reactor vessel cell 101 to a level that submerges the reactor coolant system piping 112. The borated water also has a sufficient amount of boron to keep the fuel subcritical at low temperature; when mixed with the reactor coolant in a loss-of-coolant accident.

Each one of the four reactor coolant pump cells 105 has two compartments; pump motor and pump casing. The free space 114 is immediately around the pump casing 106 forms the lower compartment. The motor compartment 124 houses the pump motor 125. The motor compartment 124 can be supplied either with an air or inert gas atmosphere; at the same time the rest of the free space (free volume) 114 in the primary containment can be maintained either at a high-vacuum or at atmospheric pressure.

The steel diaphragm 126 separates the pump cell into two compartments. The diaphragm is seal welded to the pump casing and to the cell liner to form the upper (motor compartment 124.

The steel liner at the motor compartment is completely seal welded at the dished head 127. The head can be readily cut to provide entry for the replacement of a pump motor through hatch 337. After pump replacement a dished head is rewelded into place.

At the upper compartment of the reactor vessel cell a second barrier is provided by the borated water 204 in the reactor refueling cavity 205. Vent pipes not shown are routed through the primary containment concrete structure 115 from the flanged dome 202 to the steam generator cells 103. The vent pipes are equipped with isolation valves to permit maintaining a vacuum in the rest of the primary containment when access to the control rod drive compartment is desired. During operation at power the valves on the vent lines are opened in order to maintain a high-vaccum at the upper compartment.

Secondary containment also takes the form of secondary enclosures positioned within the massive concrete structure 115 of the reactor containment system. These enclosures house reactor auxiliary and service equipment, potentially radioactive equipment, and also the deep well. Some of the enclosures are maintained at a high-vacuum; other enclosures may have either an air or inert atmosphere. The reactor auxiliary equipment enclosures are vented to the deep well.

The deep well enclosure 201 is filled with highly borated water 206. The borated water has a boron concentration equivalent to that in the reactor coolant during refueling operations. On reactor shutdown for refueling, the borated water is pumped from the deep well into the reactor cavity. After completion of the refueling operation the borated water is drained back into the deep well from the refueling cavity. The well has an inner zone 207 and an outer zone 208 that are separated by a concentric steel cylinder 209 that extends from near floor level to an elevation slightly below the operating level of the borated water. The outer zone serves as a heat sink for high-temperature fluid that is vented directly into the deep well; i.e. the blowdown from the reactor coolant system pressurizer, from the steam generators, from the secondary containment enclosure for the reactor coolant system, and from secondary enclosures.

At the inner zone 207 of the deep well the borated water serves as a heat transfer media for the decay heat in the post-accident period following a loss-of-coolant accident. This heat is transferred by the borated water from the primary containment to the cooling pond. At the inner zone a steel baffle 210 separates the zone into two annular passages. Cooling pipes 211 are positioned at the inner passage are connected to headers 212 that are routed to the reactor vessel cell 101. Cooling coils 213 positioned at the outer passage are connected to headers 214 that are routed to an outdoor cooling pond.

In a loss-of-coolant accident the reactor vessel cell 101 fills with the reactor coolant blowdown and deluge water. Thermal circulation through the cooling pipes 211 transfers sensible heat to the borated water 206 in the deep well. Thermal circulation of the well water in turn transfers the sensible heat to the cooling pond water thermally circulated through the cooling coils 213.

The cooling coils also serve to transfer the sensible energy that is vented directly into the deep well outer zone 208 from blowdown of the reactor system or blowdown of the steam generators. Thermal circulation of the well water through the cooling coils 213 transfers the heat to the cooling pond water.

The deep well is constructed with reinforced concrete walls 215; this wall provides additional biological shielding during operation of the reactor. The well is lined with steel plate 216, a high-vacuum can be maintained at the well during normal reactor operation.

An enclosure 217 is provided for the safety valves and relief valves 218 that protect the reactor coolant system against high pressure. These valves are installed on pipes that lead from the pressurizer 108. The discharge headers 219 for the valves are piped into the deep well. Also, electrical, instrument, and control leads are routed to the pressurizer through the safety valve enclosure 217.

A vent is provided for the safety valve enclosure 217; the vent is piped into the deep well and has sufficient length to act as a barometric leg. A flanged and bolted hatch 223 provides access to enclosure 217. A hatch 359 and ladder 361 provide access to the deep well from the safety valve enclosure.

Within the safety valve enclosure hinged manholes 224 are positioned for access to the two adjacent steam generators 103. Each manhole has two flanged dished heads in series and each flange has o-ring seals.

Enclosure 225 houses the non-regenerative heat exchanger 226 and the letdown heat exchanger 227. This heat exchanger enclosure has a vent 228 that leads into the deep well 201. The vent has sufficient height to serve as a barometric leg. A hatch 360 and ladder 362 provides access to the deep well from the heat exchanger enclosure.

Two separate flanged and bolted hatches 229 provide access to the heat exchanger enclosure. Each hatch is sized for the retrieval of the tube bundle from heat exchanger located directly underneath.

Within enclosure 225 access to the reactor coolant system is obtained through two separate manholes 224. These hinged manholes are located at the two adjacent steam generator cells 103. Each manhole has two flanged dished heads in series and each flange has o-ring seals.

All electrical, instrumentation and control leads and process piping required for the regenerative heat exchanger 110 are routed through enclosure 225.

A service equipment enclosure 230 is provided for each reactor coolant pump 106. All electrical, instrumentation, and control leads and process piping required for pump operation are routed through the enclosure. Bolted hatches 231 at each enclosure 230 provide access to this service equipment. Flanged and bolted manholes 224 provide access to the pump motor compartment 124. The manholes have two flanged dished heads in series and each flange has o-ring seals.

Radwaste storage enclosure 232 houses a partial torus-shaped steel container 233 that is partitioned into a number of adjacent tanks in series. These tanks provide storage for radio-active fluids; equipment and building drains, off-gas from the reactor system, spent chemical solutions, etc. The associated pipe headers 234 for the tanks are so routed within the enclosure, that the valves 235 are accessible for maintenance and also positioned for the installation of extension stems 236. The extension stems permit operation of the valves from the adjacent piping enclosure 237. An access passage 238 to the radwaste enclosure 232 is reached through the piping enclosure.

Enclosure 237 serves as a pipe tunnel and valve station for piping routed from the steam generator cells. This includes the steam headers 239 and the feedwater lines 240. This includes the steam headers 239 and the feedwater lines 240. This piping exits out of pipe tunnel 237 through an extension 241 of the circular-shaped piping enclosure. Penetration panels 356 are provided for piping exiting the reactor building. A vent pipe 222 is routed from the radwaste storage enclosure 232 to the deep well. The vent has sufficient length to serve as a barometric leg.

Vacuum lines 220 from the primary container are also routed into the pipe tunnel. Steam ejectors 242 with barometric legs and vacuum pumps 243 are piped to the vacuum lines 220 leading from the steam generator cells. This equipment is located in the auxiliary equipment shaft 306 that is integral to the reactor building 301.

Isolation valves 244 are provided on the steam headers and feedwater piping within extension 241 of the piping enclosure 237. Isolation valves 221 are similarly provided on the vacuum lines.

Safety valves and relief valves 245 for the steam headers 239 are strategically located within the piping enclosure 237. The discharge headers 246 for the valves are routed into the deep well 201.

Piping enclosure 237 is vented into the deep well through piping (not shown) that is routed via enclosures 217 or 225. This permits the vent pipes to be so positioned that a barometric leg can be utilized. The vents are sized large enough to adequately handle the rupture of a steam header 239 without causing damage to the adjacent torus 233 or to the enclosures 232 or 237.

A personnel lock 247 is utilized to provide access to the piping enclosure 237. The lock is positioned at a higher elevation than the floor levels of the enclosures. In the event of a tank or pipe rupture, all leakage is retained within the two enclosures 232 and 237.

Tertiary containment consists of the reactor building 301 that is designed to be operated normally at a slight vacuum. The primary containment cells along with the attendant secondary enclosures, the low pressure auxiliary systems, and the reactor service systems are completely housed within the reactor building. The outdoor cooling pond and the plant exhaust system tunnel 366 along with a standby gas cleaning system 358, exhaust piping and vent pipes are part of the tertiary containment.

The reactor building 301 is circular in shape and of concrete construction. The building has a roof 302 that is supported by the building outside walls and by the four steam generator cells 103.

A bridge crane 303 is also supported by the reactor building sidewall and the steam generator cells. Cutaways at the cells provide a mounting platform for the crane rails 304.

Two equipment shafts are external to the circular portion of the reactor building, but are constructed integral with the building having the same degree of structural quality.

A service water equipment shaft 305 is positioned at plant North. An auxiliary equipment shaft 306 is located at 180° to North.

Service water equipment includes the component cooling heat exchangers and pumps 370 and 371 and the service water pumps 372. In addition, shaft 305 contains a passenger elevator 307 and a stairwell 309.

The auxiliary equipment shaft 306 houses a freight elevator 308 and a stairwell 309 as well as a number of service systems and auxiliary equipment.

Access to the reactor building is gained via the personnel lock 312 located adjacent to the service water equipment shaft 305. An equipment lock 313 also provides access to the reactor building. The lock is part of the structure comprising the auxiliary equipment shaft 306. An emergency lock 314 for personnel leads out of the auxiliary equipment shaft 306 directly off the stairway. All three access openings to the reactor building are normally located at the ground elevation (fifth floor). At reactor sites where flooding is a concern, the access openings can be elevated to the sixth floor.

Detailed consideration is given to the practical utilization of open space surrounding the "reactor island" within the reactor building. The sixth (top) floor is used for reactor control and plant administrative purposes. The fifth floor includes areas for reactor refueling, personal comfort, health and safety, maintenance shops, electrical, and control equipment. The fourth and third floors contain reactor auxiliary systems, service systems, plant heating, ventilation and air conditioning equipment. The second floor is used for the storage of contaminated gases and liquids, pipe tunnels, valve stations, racks for electrical, instrument, and control wiring. The bottom floor has a radwaste area, storage tank area, and a reactor monitoring equipment area.

The floor areas are presented in greater detail. The sixth floor includes control room areas 315, computer area 315A, office 316, lunch room 317, auditorium 318, conference room 319, classroom 320 and lavatories 321.

The sixth floor overlooks the resistor refueling area, Windows 322 are provided for viewing refueling operations. Balcony 323 serves as an observation deck for refueling operations.

At the fifth floor the reactor refueling area includes the reactor cavity 205, the spent fuel pool 324, and the standby pool 325. Gates 326 installed at either side of the reactor cavity isolate the pools from the cavity. The reactor cavity and the two fuel pools are filled with highly borated water.

On reactor shutdown for refueling, the borated water 204 in the reactor cavity is drained into tanks located in the borated water storage area 327 at the first floor. After the flanged dome 202 is removed, the reactor vessel flanged head 118 is readied for removal. The reactor cavity is filled with the borated water 206 from the deep well 201 as the reactor vessel head is raised with the rising water level.

The new fuel storage vault 357 is in a convenient location. On completion of the refueling operations the reactor vessel flanged head is lowered back on the vessel as the borated water 206 is drained from the reactor cavity to refill the deep well. After the reactor vessel flanged head and the flanged dome are reinstalled, the borated water 204 is pumped back into the reactor cavity from the first floor borated water storage tanks. On reactor start-up as the reactor coolant is heated, excess water is drained from the reactor system and stored in the borated water storage area 327 until processed.

The spent fuel pool is connected to an adjoining cask pit 328 through a channel equipped with a gate 326. The pit can be drained and utilized as a decontamination pit after spent fuel is loaded into the shipping cask. After decontamination, the shipping cask is moved out of the reactor building by rail via the equipment lock 313. A railroad spur (not shown) is routed into the reactor building via the equipment lock.

Overflow pipes 338 at the refueling pit and at the fuel pools are utilized in maintaining liquid level. The overflow is directed to tanks in the borated water storage area 327.

At the refueling elevation a bridge and trolley 329 are provided for reactor refueling and spent fuel handling operations. A bridge and trolley can be provided for each pool.

The two pools have triangular-shaped shelves 330 that can be used for the storage of fuel handling equipment.

The reactor cavity 205 has sufficient space for the underwater storage of the reactor vessel core barrel 331 and for the reactor vessel internals 332.

The flanged dome 202 and the reactor vessel flanged head 118 are stored at the laydown area 333 at the far end of the standby pool 325 during the refueling operation.

Thermal convection cooling is provided at each pool for fission decay heat from the spent fuel in the pool. Paired pipe headers 334 leading to and from the cooling pond are routed into a vertical attitude within each pool. Horizontally mounted cooling pipes with extended fins 335 connect the pool inlet and outlet headers. The cooling pipes have a slight rise from the inlet to the outlet header to enhance thermal circulation. Also, the return headers to the pond are positioned at a higher elevation than the headers flowing water from the pond to the pool cooling pipes. At each pool a steel baffle 336 is positioned adjacent to the cooling pipes. The baffle fronts the cooling pipes and extends almost the full height of the pool — from near the pool floor to slightly beneath the borated water level. The pool water within the passage formed by the baffle and the well is cooled and the increased density of the water causes thermal circulation to take place.

The level of the water at the cooling pond is at a higher elevation than the level of the borated water in the pools. Water leakage is monitored by periodic analysis of the boron concentration in the pool water.

Isolation valves 244 (normally locked open) on the headers 334 permit inspection of the cooling assembly. By closing the valves and unbolting flanges at the headers (located above the pool water level) the cooling assembly can be lifted clear for inspection and cleaning. The high heat capacity provided by the pool water, allows time for this maintenance work without overheating the pool. Transparent covers can be provided at the spent fuel pools 324 and 325 to prevent the evaporation of tritiated water when refueling operations are not in progress. Also, a missile shield may be provided over the reactor refueling cavity 205 for power operation of the reactor coolant system.

Other areas at the fifth floor level include the reactor building intake air equipment area 373, a personnel comfort area 340A, an eequipment maintenance area 340B, health, safety and counting area 340C, cable spreading area 340D, battery area 340E, and an electrical and control equipment area 340F. Two access hatches 339 permit removal of the tube bundles from the shutdown heat exchangers.

The fourth floor has subway grating 341. Equipment areas of this floor include the boric acid tanks 203, the chemical and volume control system 342 and the heating, ventilating and air conditioning systems 343B for potentially radioactive areas. The boric acid tanks 203 and the volume control tank 369 are spotted.

The third floor provides space for reactor auxiliary system equipment including charging pumps 344, shutdown pumps 345, shutdown coolers 346, ion exchange resin beds 347, spend fuel pool pump 348, standby pool pump 349, and shield walls 350. Heating, ventilating and air conditioning equipment for clean areas 343A are included.

Second and first floor elevations show the supporting structure for the reactor complex. The reactor vessel foundation 353 directly supports the reactor vessel 102 and the concrete structure for the reactor refueling cavity 205.

The reactor equipment foundation 351 directly supports the reactor coolant pump cells 105, the regenerative heat exchanger cell 109, the spent fuel pool structures 324, and the standby fuel pool structures 325.

The deep well foundation 352 in conjuction with the other foundations are used to bridge the other structures for the steam generator cells 103, and the reactor coolant system piping cells 111. The bridged structure for the piping cells in turn serves as the concrete floor base within the refueling pools and within the reactor vessel cavity, the deep well 201 is also formed by the deep well and reactor vessel and foundations 352 and 353 respectively.

The second floor elevation has tunnels for electrical wiring 310 and control wiring 311 routed in trays 354. Non-radioactive piping is routed immediately outside the reactor equipment foundation 351. The radwaste storage enclosure 232 and the piping enclosure 237 previously described are at the second floor elevation. Also the cooling pond pipe tunnel 355 is utilized for routing the deep well cooling pipe headers 212.

The first floor provides ample space for tankage in the borated water storage area 327, and for equipment in the radwaste process area 363, and solid radwaste area 367. In-core probe equipment area 364 is provided conveniently near the bottom of the reactor vessel. Access to the enclosure 365 at the bottom of the reactor vessel is obtained through a personnel lock 368.

The design features in the Passive Containment Systems offers a structure that ensures survival of the critical elements under earthquake excitations and other acts of God. Sufficient strength is provided to resist the induced inertial forces utilizing reinforced and prestressed concrete in the concentric cylindrical foundations that tie the base and roof slabs, and the floors at the various elevations into a monolithic unit. Also the massive concrete structure forming the primary containment cells, the secondary enclosures, and the refueling pool walls add stability to the structure. Added strength can be provided if required by locating radial walls between the cylinders.

In the Passive Containment System the need for connecting elements (umbilicals) to sources of emergency water is virtually eliminated. These umbilicals used extensively for active safety systems in the prior art are especially vulnerable to faulting displacements in a severe seismic disturbance. The only connecting elements utilized by the Passive Containment System are the headers to the outdoor body of water. However, these headers are not required to be functional for a period of hours after a loss-of-coolant accident. Even if a pipe break occured in one of the headers, thermal circulation would still continue, the pipe tunnel would merely fill up with water from the outdoor body of water.

The Passive Containment System is not vulnerable to sabotage. The passive safety systems are designed integral with the basic structure and are not accessible during normal operation because of the high-vacuum within the primary container.

The Passive Containment System offers a design that permits the reactor building to be either undergrounded (submerged in water) or embedded. This provides a power plant silhouette that is esthetically attractive.

FIGS. 9 through 12 inclusive are graphical presentations of the response of reactor containment systems that illustrate the advantages of the embodiment described in detail. For these graphical presentations the reactor coolant system considered has a volume of 11,900 cubic feet containing 528,000 lb of coolant with 306,000,000 British thermal units (Btu) of stored energy. An additional 103,000,000 But of energy is available for release to the containment within the first 5 minutes after the design basis accident. A detailed discussion of the graphs is included in the section following on operation in accident.

OPERATION IN ACCIDENT

The response of the Passive Containment System in the loss of coolant accident is described. A four-loop Pressurized Water Reactor in normal operation generating 1000 megawatts of electricity is selected for illustrative purposes. The design values specified are in the design range typical for the Nuclear Plant selected. Similar evaluations of the Passive Containment System can be made for all Pressurized Water Reactors including the two and three-loop designs, as well as for all Boiling Water Reactors.

In the reactor system selected, the coolant absorbs heat in passage through the reactor vessel 102, releases the heat to generate steam in passage through the steam generators 104, and is recirculated through these components by the reactor coolant pump 106. The pressurizer 108 maintains the reactor coolant at about 2100 psia pressure to suppress boiling within the reactor coolant system. For chemical and volume control of the coolant within the reactor system, the rengenerative heat exchanger 110 is employed as an economizer to heat the incoming coolant with the outgoing coolant. This reactor system interconnected by piping 112, contains approximately 528,000 pounds of coolant with about 306,000,000 British Thermal Units (Btu) of stored energy in the coolant at a weighted average temperature of 575°F.

The primary container is designed with a free volume 114 on the order of 35,000 cubic feet. The air in this space is initially hogged out by steam ejectors and is maintained at less than 2 psia total pressure by the vacuum pumps 243 discharging into the deep well 201.

Deluge tanks 119 within the primary container altogether hold over 3,000,000 pounds of fluid 120 maintained at 40°F by refrigeration (steam jet and/or absorption). A total freeboard, slightly in excess of 1000 cubic feet at the deluge tanks, is maintained at less than 2 psia total pressure.

In the design basis, loss of coolant accident the largest pipe 112 at the reactor coolant system ruptures. A free blowdown of coolant from the two open ends of the ruptured pipe ensues. The bulk of the coolant blowdown occurs in less than 30 seconds.

Coolant blowdown through the pipe rupture pressurizes the primary container free volume 114. At about 50 psia pressure, the rupture disks 122 burst and steam carry-over into the deluge tanks 119 takes place. The ruptured disk openings 122 are designed to serve as ejector nozzles, and are spaced in relation to the circulation pipes 123 in such a manner that suction chambers at the pipe ends are formed with the pipes 123 themselves performing as diffusers to condense the steam carry-over.

The 1000 cubic feet of freeboard permits about 50,000 pounds of steam to carry over into the deluge tanks 119. The low pressure noncondensables (less than 2 psia) in the primary container are entrained by the steam and are also carried over into the deluge tanks. As the deluge tanks are filled by the carry-over and by the thermal expansion of the contained fluid, coolant blowdown continues to increase the pressure at the primary container 114. At approximately 500 psia back pressure in the primary container, coolant blowdownn from the reactor system is arrested by pressure equalization. Coolant blowdown is stopped with about 18 percent of the reactor coolant inventory retained at the reactor vessel 102. This is a sufficient amount of coolant to keep the nuclear fuel effectively submerged in fluid.

With steam carry-over into the deluge tanks 119 stopped, the static head of fluid 120 within the tanks reverses the direction of flow through the ruptured disk openings 122. A cross sectional flow area provided by all the openings (over 75 square feet) permits the tanks to practically empty under gravity flow within five minutes after a double-ended pipe rupture. This deluge fluid occupies more volume than that initial present as free volume within the primary container 114. Therefore, the reactor coolant system piping is completely submerged by the deluge fluid.

After deluge with temperatures within the primary container and within the reactor vessel being equalized, the weighted temperature of all fluid is about 154°F. This temperature reflects the total stored energy in the coolant (306,000,000 Btu) plus an additional 103,000,000 Btu in the form of stored energy from the nuclear fuel, internal structures and reactor components, as well as the decay heat release for the first five minutes after the accident. At 154°F, the vapor pressure is less than the combined pressure of the container atmosphere and the static head of fluid above the pipe break; this permits fluid to flow into the reactor system refilling the system to the level of deluge fluid.

In the loss of coolant accident with the nuclear fuel always submerged and with a deluge taking place that effectively refills the reactor system within a few minutes after the pipe break, the melting of fuel is prevented. The fission products escaping from the fuel are limited to the "prompt" release that results from mechanical clad failures. This restricts the release to fission products that have migrated to the void space between the fuel and cladding. The "prompt" release is confined to a few percent of the fuel inventories of noble gases and iodines. This release is small compared to the releases which must be assumed in current licensing practices.

The primary container is at elevated pressure only a short time, less than five minutes, in the design basis loss of coolant accident. Any leakage from the primary container is for the most part retained by fluid in the secondary container. Any leakage through container penetrations is confined within the enclosures for reactor auxiliaries normally operating at a subatmospheric pressure. Also, sufficient deluge fluid is present in the primary container to take into solution all fission products escaping from the fuel in a "prompt" release.

After deluge with its temperature at 154°F, the fluid now flooding the primary container has sufficient heat capacity to absorb the decay heat generated during the first hour after the accident without the primary container pressure increasing above atmospheric pressure. In this time period the decay heat generation rate has decreased appreciably. The passive heat transfer system is designed to transfer the decay heat at the generation rate present after the one hour period, about 188,000,000 Btu per hour. This heat transfer requirement can be lowered still further by accounting for the heat transfer actually taking place in the first hour. The passive heat transfer systems using the coupling fluids in the deep well and in the container annulus are designed for the transfer rate specified with the deluge fluid in the primary container at 200°F maximum and the outdoor body of water at 100°F maximum. At these conditions the vapor pressure combined with the pressure of the noncondensables in the primary container is retained below atmospheric pressure and leakage from the containment does not occur in the post accident period.

The stored deluge fluid 120 and the fluid in the annulus between the primary and secondary containers have various chemicals in solution to serve as neutron poisons, oxygen "getters," fission product "getters," and freezing point depressants. The neutron poison considered may include but are not limited to boron, cadmium and hafnium. In addition to operating the primary container at a high vacuum and degassing the fluids, additives such as hydrazine and sodium sulphite can be used as oxygen "getters." The fission product "getters" may include but are not limited to sodium hydroxide and sodium thiosulphate. The freezing point depressants are not limited to the numerous related alcohols, such as ethylene glycol.

These chemical additives serve a definite purpose in the accident situation. The neutron poisons prevent the nuclear fuel from getting "critical" at the low fluid temperatures in the post accident periiod.

The oxygen "getters" serve as oxygen scavengers for the radiolytic oxygen formed by the decomposition of water in the post accident period. By scavenging the oxygen, an explosive concentration with radiolytic hydrogen cannot be formed. A sufficient amount of scavenging agent can be added to the fluids to combine with all of the radiolytic oxygen generated in the post accident period to virtually eliminate any radiolytic oxygen release to the containment atmosphere.

Deluge fluid, such as water by itself is able to absorb all fission products into solution to a large degree. In addition dissolved chemicals can be used to combine with the fission products to form stable compounds. This provides additional assurance that fission products cannot leak out of the containment in the post accident period.

The freezing point depressants allow the fluids used for accident containment to be maintained at low temperatures without the danger of freezing into one solid ice cake. By lowering the freezing point, the thermal capacity of the dense fluid is increased to provide an even lower post accident container pressure.

Specific attributes of the Passive Containment System are exemplified to show its uniqueness and superiority in nuclear reactor containment design. These attributes are highlighted with the aid of graphs presented in FIGS. 9 through 12, inclusive.

Figure 9:
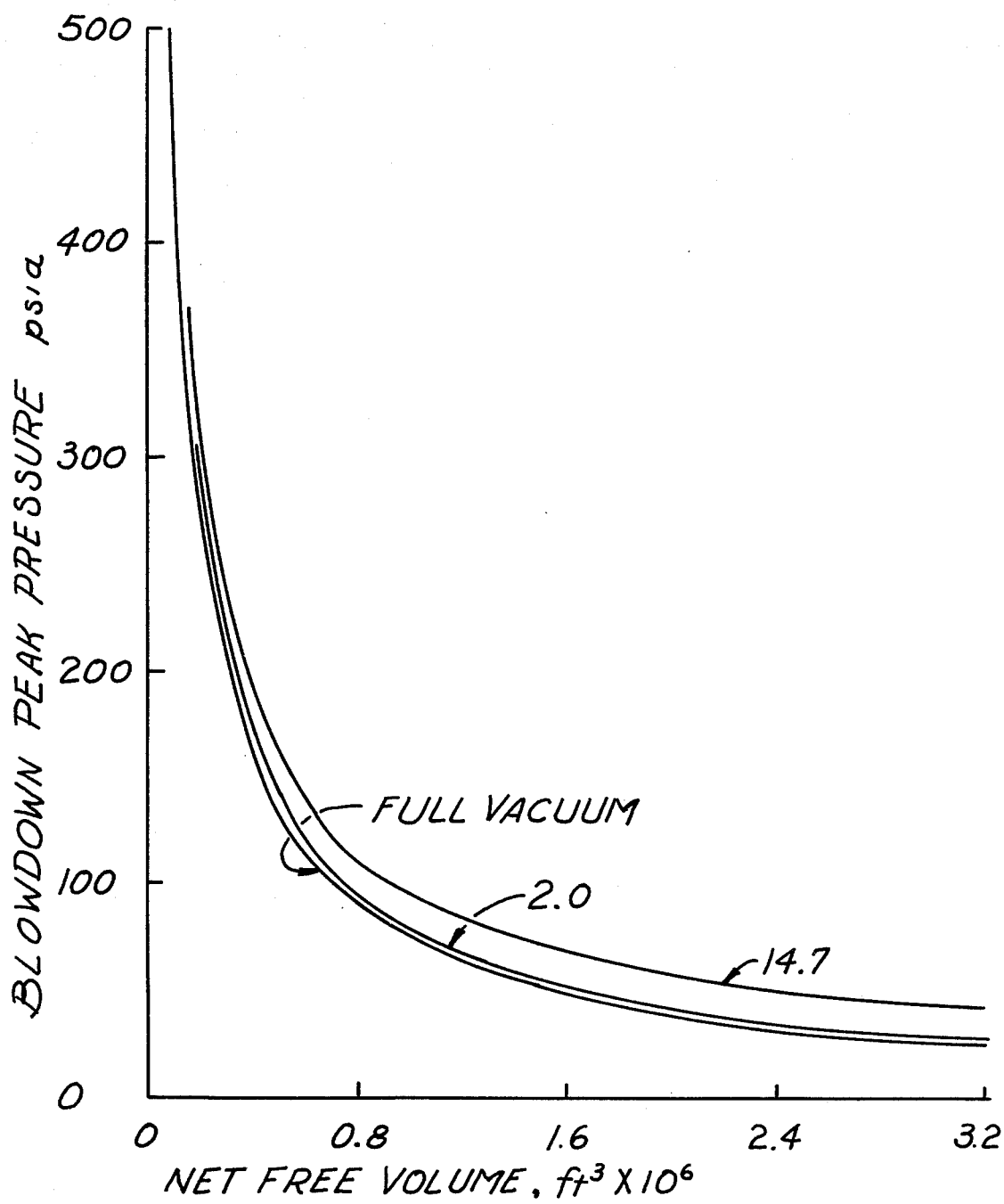
FIGS. 9 through 12 inclusive graphically depict various containment considerations in the design bases, loss-of-coolant accident for a pressurized water reactor that generates 1000 mw of electricity, and specifically.
Figure 10:
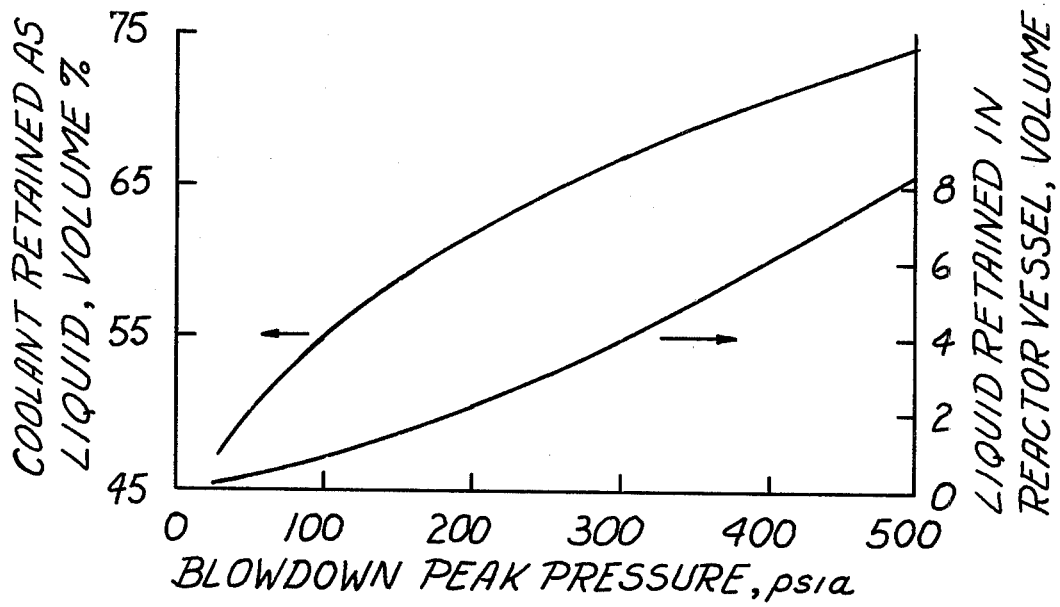

As the peak accident design pressure is increased, a significant reduction in the primary container free volume requirement is attained, FIG. 9. Again, as the containment peak accident pressure (primary container back pressure) is increased, the mass of reactor coolant retained in the liquid phase is increased markedly, FIG. 10.

An object of this disclosure is to specify a containment system that retains by passive means sufficient coolant within the reactor system to keep the nuclear fuel submerged to prevent overheating and melting. Full pressure (dry-type) containment required excessively high back pressure to accomplish this object.

Steam carry-over into the deluge tanks is utilized to reduce this full pressure containment requirement. Steam carry-over provides a higher energy carry-over per pound of coolant as compared to energy carry-over for the vapor suppression pool system in the prior art (about twice as much energy per pound of coolant on the average). With steam carry-over, sufficient coolant is passively retained within the reactor vessel of the Passive Containment System to prevent overheating of the fuel.

The containment systems in the prior art are dependent on active coolant injection systems to supply makeup coolant into the reactor vessel. If the active systems fail to operate, gross melting of the fuel takes place within a score of minutes after pipe rupture in the design basis loss of coolant accident.

Figure 11:
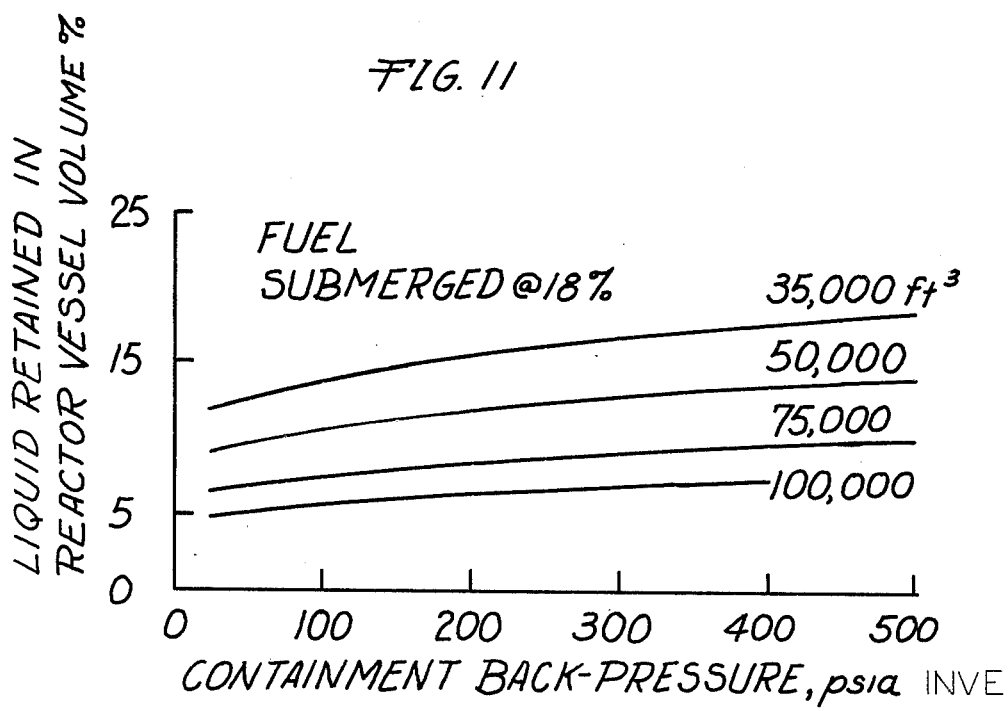

With steam carry-over into the deluge tanks, the pressure volume requirement is significantly reduced (compare FIG. 11 to FIG. 9). In order to retain the fuel submerged in coolant, a high back pressure is utilized to prevent excessive blowdown from the reactor vessel. Also, the primary container free volume is restricted so that the mass of coolant present within the primary container itself at the peak accident pressure is not excessive.

In analyses of the coolant blowdown for the graphical presentations (FIGS. 10 and 11), it is conservatively assumed that the same ratio of liquid to steam exists in the primary container as in the reactor vessel. In actuality, the bulk of the coolant blowdown taking place is two phased (liquid and steam) so that more liquid is retained within the reactor system than the analysis indicate. The pressure-volume values that retain the fuel submerged are thus conservatively indicated in FIG. 11.

In the Passive Containment System all extrinsic materials are removed from within the primary containment to reduce its size in order to design for the necessary pressure-volume relationship that retains the fuel submerged at the end of coolant blowdown. These materials include the evacuation of air in addition to the removal of all auxiliary systems, auxiliary components and internal structures. The evacuation of air to a high vacuum eliminates the need for thermal insulation at the reactor coolant system external surfaces. Such auxiliary systems as the pressurizer quench, containment spray, service water, hot and cold drains, and also the containment coolers consisting of fan units, filter units, moisture eliminators, cooling coils, ductwork, instrumentation and controls are either eliminated or displaced from within the primary container. Auxiliary components such as the reactor building crane, refueling bridge and trolley fuel transfer mechanisms and fixtures, and reactor vessel servicing equipment are displaced from the primary containment and are made accessible for servicing at all times within the reactor building. Also displaced from the primary container are the massive concrete structures forming: internal walls and floors, equipment supports; namely, supports for the reactor coolant system components, biological shields, missile shields, reactor refueling cavity walls and fuel transfer canal walls. The materials itemized are all normally present in the existing containment systems for the Pressurized Water Reactor. The removal of these materials from the primary containment further exemplifies the unique character of the Passive Containment System.

By removing the extrinsic materials from within the primary container, the internal volume is sufficiently reduced so that small diameter interconnected primary containment cells can be utilized in the Passive Containment System. The cell diameters are reduced by factors of about five to 10 as compared to the diameters of existing containment structures for the Pressurized Water Reactors. By reducing the containment cylinder diameters by a factor of five or more, the containment peak accident pressure can be increased by approximately the factor of five or more with the same containment wall thickness dimensions for a given material.

The gain in reactor containment design realized by these attributes of the Passive Containment System are readily shown by containment net free volume requirement for the various containment systems for nuclear power plants operating in the same power range:

Full Pressure (Dry type) — 2,610,000 cu ft
Vapor Suppression, utilizing ice — 1,200,000 cu ft
Vapor Suppression, utilizing water — 278,000 cu ft
Passive Containment System — 35,000 cu ft

The significant reduction in the size of the containment enhances the design bases for the Passive Containment System. The small volume of air enclosed within the primary container is readily hogged out within a two-hour period of time by the steam ejectors. Low pressure steam can be used to help flush out the air. A high vacuum (less than 2 psia) is readily maintained with a 2 cfm vacuum pump; the leakage that can be handled by the pump is higher than the acceptable range of leakage 0.1 to 0.5 percent per day currently in use. The vacuum pump discharge is directed into the deep well. Also, during maintenance operations, the primary container is readily ventilated using spool pieces to connect the reactor building ventilation system to the vacuum lines emerging out of the primary container.

The small enclosed free volume in the primary container enhances the retention of liquid coolant within the reactor system. Basically, at a set back pressure, as the enclosed free volume is decreased in size, the amount of coolant hold up within the primary container decreases in proportion; and thereby increases the coolant retained in the reactor system. Again, as the container back pressure is increased, the amount of coolant present in the liquid phase is increased; this is the case for both the reactor system and the primary container held at fixed volumes. With steam carry-over into the deluge tanks taking place during coolant blowdown, greater flexibility is provided for establishing the container size and back pressure. The steam carry-over into the deluge tanks also decreases the enthalpy of the coolant remaining. A lower enthalpy results in a higher proportion of the coolant mass retained as liquid at a set back pressure, as compared to coolant at the higher enthalpy. these fundamentals offer greater latitude in the containment design and permit the optimization of the steam carry-over, the container free volume and the back pressure so that the nuclear fuel remains submerged in liquid throughout the loss of coolant accident. These design features are applied in the development of the graph in FIG. 11. Added considerations in the establishment of the container free volume and the design pressure are the accessibility desired for shutdown inspection and maintenance operations; the cross sectional flow areas required for coolant blowdown; and the flooding of the containment with deluge fluid so as to passively refill reactor system.

In sizing the primary container, it may be desired to provide more space for inspection and maintenance operations than the design permits for retaining the fuel submerged in coolant. The inventory of coolant in the enlarged container may leave an insufficient amount within the reactor system. In this case, passive accumulator systems can be located within the primary container to inject makeup directly into the reactor system.

Again, it may be desired to design the primary container for a lower pressure than the design permits for retaining the fuel submerged in coolant. The passive accumulator systems can be employed to augment the coolant retained at the lower back pressure in order to completely submerge the fuel.

One or more accumulators may be located within the primary container to passively inject fluid directly into the reactor coolant system to augment the coolant retained within the reactor system by high containment back pressure in the LOCA. The fluid in the accumulator tanks is isolated from the reactor coolant by rupture disks or a number of check valves in series. Whenever the reactor coolant system pressure falls below the accumulator pressure, as in the case of a LOCA, the pressure difference causes the rupture disks to burst or the check valves to open allowing the fluid to be injected into the reactor coolant system. The fluid in the accumulator tanks is pressurized either by an inert gas or by pipe circuits connected to the sub-cooled liquid region of the reactor system steam generator secondaries. Alternatively, the steam generator secondaries can be directly connected to the reactor coolant system with either rupture disks or check valves positioned in series on the connecting piping. In either case, the containment back-pressure is designed to keep the inert gas bubble or the steam bubble from entering the reactor coolant system. The injected fluid has soluble poisons to make the reactor fuel subcritical. Also, the amount of deluge water takes into consideration the stored energy added into the reactor coolant system by the borated steam generator fluid.

Figure 12:
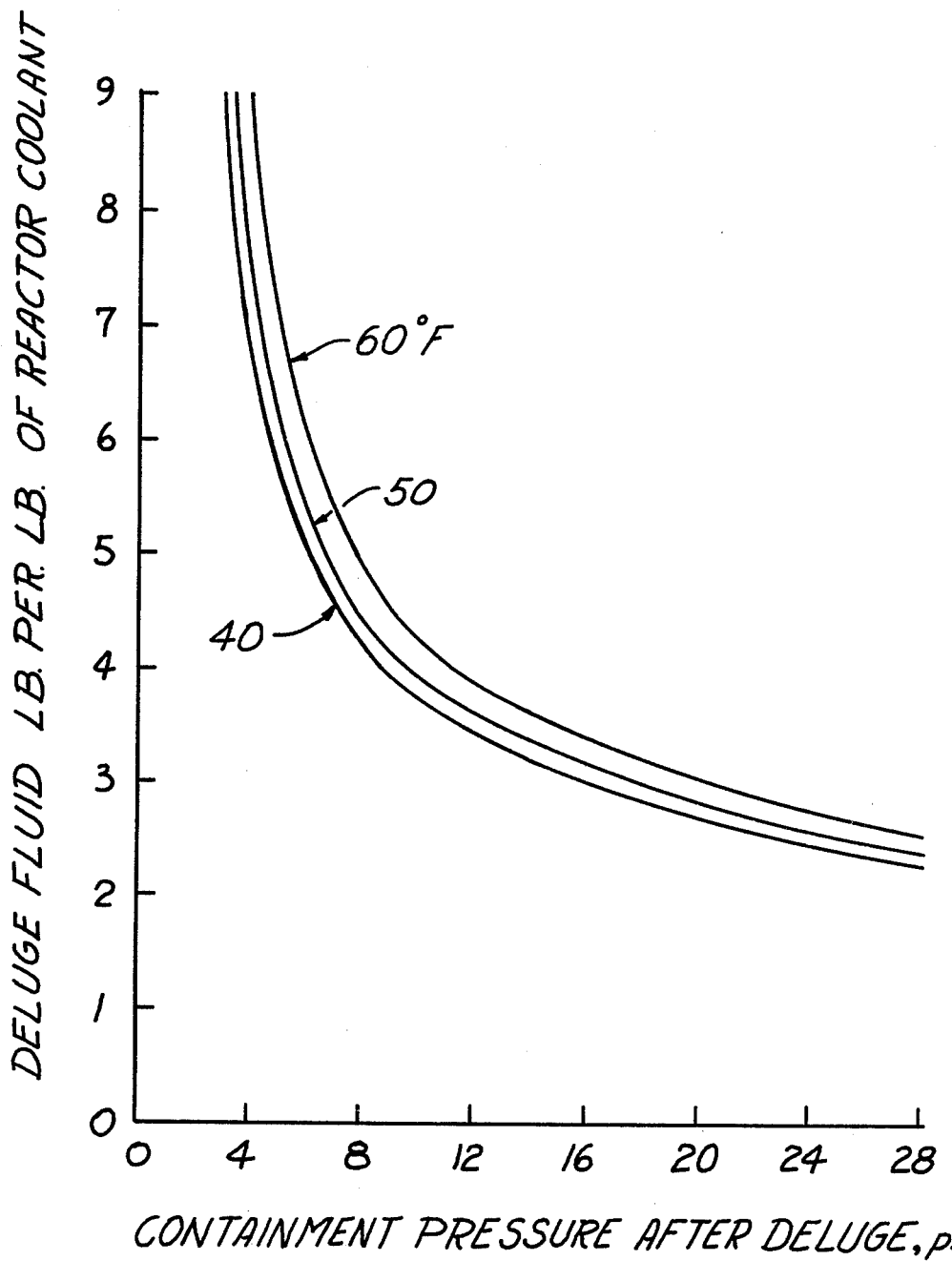

A small enclosed free volume in the primary container enhances the fluid deluge by making possible a complete fill of the container that in turn assures a refill of the reactor coolant system. The removal of the thermal insulation at the reactor coolant system provides a good heat flow path through the metal walls for the transfer of the stored energy remaining in the reactor system aafter blowdown, as well as for the shutdown gamma heat. The placement of the deluge tanks offers freedom in providing a sufficient quantity of fluid and in chilling the fluid so that sufficient heat capcity is present in the deluge fluid to return the primary container to a high vacuum (low vapor pressure as shown in FIG. 12. This may be contrasted to the containment systems in the prior art that retain an elevated pressure within the containment for days after an accident.

A small enclosed volume in the primary container further enhances the inherent safety features of the Passive Containment System that prevents the combustion of radiolytic hydrogen. This hydrogen is formed from the decompostion of water by the high intensity gamma radiation present within the reactor vessel. The combustion of hydrogen is prevented by oxygen depletion; the small primary container is pumped down to a high vacuum so that only a trace amount of oxygen is present; the dissolved oxygen concentration in the deluge fluid is depleted by mechanical deaeration and by chemical deaeration to remove the last traces of the dissolved oxygen; also a sufficient amount of residual chemical deaerant is added to the deluge fluid to completely scavenge the radiolytic oxygen formed (for example 400 parts per million or more of sodium sulphite). Also, the low coolant temperature after deluge arrests boiling and prevents the stripping of radiolytic oxygen and hydrogen to promote the back reaction recombining the radiolytic gases, and the low temperature keeps the radiolytic hydrogen below the flammable temperature range.

Chemical additives are incorporated into the deluge fluid to enhance fission-product dissolution and trapping to assure their retention. An alkaline-borate solution containing sodium thiosulfate is effective in retaining iodines. An added benefit of the alkalines is that they serve as pH agents to limit corrosion.

The alkaline-borate solution also serves a neutron poison. A sufficient amount of boron is made available so that after deluge with the reactor coolant system refilled, the concentration of boron is above 2000 ppm throughout the fluid in the primary container and reactor system. There is no danger of crystallization as the relative low concentration of boron.

The invention hereof can be usefully applied to nuclear reactors employing light and heavy water, liquid metal, and/or molten salts. Because of longer experience with light water breeder reactors (LWBR) and the compelling need for uban siting of such powerplants, the instant disclosure importantly makes possible the realization of such installations within economic constraints, and within the desired ten mile radius of cities. Such underground or underwater installations for LWBR are readily possible by employing the inventive concept herein.

Radioactivity containment is of prime concern in the instant invention. Containment during normal operation as well as during LOCA, and particularly during post accident heat removal requirements, by employing novel high vacuum conditions is now possible through the instant disclosure and its related teachings. The invention lends itself to a practical design for power reactors in that the free volume hereof required for containment purposes between the inner and outer chambers is realistically small and economically very desirable. Biological containment is inherent.

It may thus be seen that the instant invention is broad in scope and since departures from the specific system and configuration herein described may be made by persons skilled in the art without departing from the concept hereof, it is intended that all matters contained in the aforegoing drawings and description shall be interpreted as illustrative and not in a limiting sense.

The invention claimed is:

1. A safeguard system for a nuclear reactor plant having a reactor, at least one vapor generator, said vapor generator having an operative connection to said reactor for the flow of a high-temperature high-pressure reactor coolant therethrough, and a containment structure sealingly enclosing at least said reactor and said vapor generator, said safeguard system comprising a body of fluid cooling liquid disposed generally internally of said containment structure and within a tank structure situated within an otherwise free space of said reactor plant first conduit means carried by said tank structure and adapted for communication between said fluid cooling liquid and the interior of said containment structure, and pressure responsive means cooperating with said first conduit means for normally preventing flow of said fluid cooling liquid into said interior of said containment structure, said pressure responsive means being so siutated as to normally be in intimate contact with said fluid cooling liquid, said pressure responsive means being effective to complete said communication through said first conduit means whenever said interior of said containment structure attains a predetermined increased pressure arising out of an accidental loss of reactor coolant into said interior of said containment structure, the said completion of said communication enabling said fluid cooling liquid to flow into said interior of said containment structure and into heat exchanging relationship with said reactor thereby maintaining said reactor at a safe temperature.

2. A safeguard system according to claim 1 wherein said body of fluid cooling liquid is at an elevation so as to have at least a major portion thereof at an elevation above the elevation of said reactor.

3. A safeguard system according to claim 1 wherein said body of fluid cooling liquid is at an elevation so as to have at least a major portion thereof at an elevation above said operative connection.

4. A safeguard system according to claim 1 wherein said body of fluid cooling liquid is of a volume sufficiently great to envelop said operative connection when said fluid cooling liquid flows into said interior of said containment structure.

5. A safeguard system, according to claim 1 wherein said tank structure is carried generally within said containment structure as to thereby minimize the otherwise free space within said containment structure.

6. A safeguard system according to claim 5 wherein said first conduit means comprises a plurality of conduit sections spaced from each other and carried by said tank structure, and wherein said pressure responsive means comprises a plurality of pressure responsive devices respectively operatively associated with said plurality of conduit sections.

7. A safeguard system according to claim 5 wherein said tank structure is sealingly closed at the top portion thereof, wherein said first conduit means comprises a plurality of conduit sections spaced from each other and carried by said tank structure, said conduit sections being at least partially filled with said fluid cooling liquid prior to said completion of said communication.

8. A safeguard system according to claim 7 wherein the relative volumes of said fluid cooling liquid and the interior of said tank structure are such as to result in a void space within said interior of said tank structure immediately above the top-most surface of said fluid cooling liquid.

9. A safeguard system according to claim 5 wherein said tank structure is sealingly closed at the top portion thereof and sealingly closed at the lower portion thereof by related lower disposed wall means, wherein said first conduit means comprises a plurality of conduit sections spaced from each other, each of said conduit sections comprising a first upper disposed conduit portion generally contained within said tank structure and having a first upper end open for communication with said fluid cooling liquid and a second lower end also open for communication with said fluid cooling liquid situated within said tank structure but without said first conduit portion, each of said plurality of conduit sections also comprising a second lower disposed conduit portion formed through said lower disposed wall means and in general axial alignment with the related said upper disposed conduit portion, and wherein said pressure responsive means cooperate with said lower disposed conduit portions to normally prevent flow of said fluid cooling liquid from said tank structure.

10. A safeguard system according to claim 5 wherein said tank structure is sealingly closed at the top portion thereof and sealingly closed at the lower portion thereof by related lower disposed wall means, wherein said first conduit means comprises a plurality of conduit sections spaced from each other, each of said conduit sections comprising a conduit portion generally contained within said tank structure and having a first upper end open for communication with said fluid cooling liquid and a second lower end also open for communication with said fluid cooling liquid situated within said tank structure but without said conduit portion, said upper and lower ends of said conduit portion enabling circulation of said fluid cooling liquid contained within said tank structure within and without said conduit portion.

11. A safeguard system according to claim 1 wherein said tank structure is of generally annular configuration with an axially upper closed end and an axially lower closed end, and wherein said first conduit means comprises a plurality of conduit sections spaced from each other and carried generally by and within said annular tank structure.

12. A safeguard system according to claim 1 wherein said tank structure having relatively inner and relatively outer walls combining to have an outer configuration that of a generally inverted cup-like configuration with a chamber between said inner and outer walls for containing said cooling liquid.

13. A safeguard system according to claim 1 wherein said containment structure comprises a sealed primary container housing at least said reactor and related reactor coolant system means, said primary container being of a size as to create a minimum of void space consistent with access to said reactor coolant system means in order to have any of said reactor coolant as may accidentally escape from said related reactor coolant system means quickly expand and increase the pressure within said void space to a magnitude of said predetermined increased pressure.

14. A safeguard system according to claim 1 wherein said containment structure comprises a sealed primary container housing at least said reactor and related reactor coolant system means, said primary container being of a size as to create a minimum of void space consistent with access to said reactor coolant system means in order to have any of said reactor coolant as may accidentally escape from said related reactor coolant system means quickly expand and increase the pressure within said void space to a magnitude of said predetermined increased pressure, said containment structure also comprising a sealed secondary container surrounding said primary container and a sealed tertiary container completely surrounding said secondary container.

15. A safeguard system according to claim 14 and further comprising isolated compartments provided within said primary container for therein locating components operationally related to said reactor, and wherein said components comprise reactor coolant pump motors and reactor control rod drives.

16. A safeguard system according to claim 14 and further comprising a deep well for containing additional cooling liquid adapted to be placed in operative heat-exchanging relationship with said reactor, second conduit means adapted for communication with said primary container and said deep well, pressure relieving means operatively connected to said second conduit means for completing communication from said primary container to said deep well whenever the interior of said primary container attains a second predetermined increased pressure arising out of an accidental loss of reactor coolant, said communication through said second conduit means being effective to direct a vaporized portion of said reactor coolant within said interior of said primary container into coupling fluid within said deep well.

17. In a nuclear reactor plant comprising a reactor assembly, reactor assembly coolant system means comprising reactorr coolant conduit means, high-pressure high-temperature reactor coolant circulated within said reactor coolant system, and a containment structure sealingly enclosing at least said reactor assembly and said reactor coolant system means, the method of affecting containment of said reactor plant during accidental loss of said reactor coolant from said reactor coolant system means, said method comprising the steps of providing a fluid body of normally kinematically inert coolant liquid, normally preventing any direct communication of said coolant liquid with said reactor coolant system means and said containment structure, permitting said high-pressure high-temperature reactor coolant as is accidentally lost to enter within a void space defined by said containment structure and vaporize within said void space to thereby increase the pressure within said void space, permitting sufficient quantities of such accidentally lost high-pressure high-temperature reactor coolant to enter and vaporize within said void space so as to cause said pressure to increase to a first predetermined magnitude, when said pressure of said vaporized high-temperature high-pressure reactor coolant attains said first predetermined magnitude permitting at least a portion of said vapor to flow through said coolant liquid to thereby cause said coolant liquid through heat transference absorb some of the energy of said vapor flowing therethrough, and permitting said vapor to continue to flow into said coolant liquid to thereby cause displacement of said coolant liquid to thereby cause said coolant liquid to flow into said void space whereby a back pressure of sufficient magnitude is developed within said void space sufficient to prevent further accidental loss of reactor coolant.

18. A method according to claim 17 wherein said high-pressure is of a second magnitude greater than said first predetermined magnitude.

19. A method according to claim 17 wherein said high-pressure is of a second magnitude originally greater than said back pressure of sufficient magnitude, and wherein the magnitude of said high-pressure is permitted to decrease as said reactor coolant continues to undergo accidental loss so that when said back pressure of sufficient magnitude is established the magnitudes of said back pressure and said high-pressure are substantially equal.

20. A method according to claim 17 and further comprising the step of permitting the continued flow of said coolant liquid into said void space as to inundate said reactor coolant conduit means.

21. A method according to claim 17 and further comprising the steps of permitting the continued flow of said coolant liquid into said void space as to place a substantial portion of said reactor assembly into heat-transfer relationship with said coolant liquid, and permitting the continued flow of said coolant liquid into said void space as to thereby inundate said reactor coolant conduit means.

22. A method according to claim 17 and further comprising the step of continuing to re-fill said reactor assembly coolant system means with additional quantities of reactor coolant.

23. A method according to claim 17 and further comprising the step of placing said reactor assembly in heat exchanging relationship with a second body of coolant liquid.

24. A method according to claim 17 and further comprising the step of transfering nuclear fuel decay heat from said containment structure to a body of water situated externally of said nuclear power plant and in communication with ambient atmosphere, said step of transfering said decay heat comprising heat transference by thermal conduction and natural convection.

25. A method according to claim 24 wherein the step of transferring said decay heat comprises the transfering of said heat through coupling fluid means.

* * * * *

UNITED STATES PATENT OFFICE
CERTIFICATE OF CORRECTION

PATENT NO. : 3,984,282

DATED : October 5, 1976

INVENTOR(S) : Frank W. Kleimola

It is certified that error appears in the above-identified patent and that said Letters Patent are hereby corrected as shown below:

Column 1, line 22, after "fission products" change "thay" to --- that ---.

Column 2, line 32, between "systems" and "used" change "ae" to --- are ---.

Column 2, line 48, before "Reactors" change "water" to --- Water ---.

Column 3, line 8, change "metalwater" to --- metal-water ---.

Column 4, line 34, after "poison" change "is" to --- in ---.

Column 6, line 16, change "UI" to --- VI ---.

Column 6, line 16, change "UIII" to --- VIII ---.

Column 8, line 9, immediately after "(motor" add a close parenthesis, ---)---.

Column 10, lines 12 and 13, delete "This includes the steam headers 239 and the feedwater lines 240."

Column 15, line 32, change "downn" to --- down ---.

Column 16, line 56, after "accident" change "periiod" to --- period ---.

Column 19, line 16, before "fundamentals" change "these" to --- These ---.

Column 19, line 65, between "poisons" and "to" insert --- in solution ---.

UNITED STATES PATENT OFFICE
CERTIFICATE OF CORRECTION

PATENT NO. : 3,984,282

DATED : October 5, 1976

INVENTOR(S) : Frank W. Kleimola

It is certified that error appears in the above-identified patent and that said Letters Patent are hereby corrected as shown below:

Column 20, line 8, after "system" change "aafter" to --- after ---.

Column 20, line 11, after "heat" change "capcity" to --- capacity ---.

Column 20, line 13, change "(low vapor pressure" to --- (low vapor pressure) ---.

Column 20, line 21, change "decompostion" to --- decomposition ---.

Column 20, line 56, before "sitting" change "uban" to --- urban ---.

Claim 1, line 11 thereof, immediately after "reactor plant" add a comma (,).

Claim 17, line 3 thereof, change "reactorr" to --- reactor ---.

*Signed and Sealed this*

*Eighth* Day of *January 1980*

[SEAL]

Attest:

SIDNEY A. DIAMOND

*Attesting Officer*  *Commissioner of Patents and Trademarks*